(12) United States Patent
Aurongzeb et al.

(10) Patent No.: US 11,995,231 B2
(45) Date of Patent: May 28, 2024

(54) SYSTEM AND METHOD FOR HEADSET HAPTIC OR AUDIO CONFIRMATION FEEDBACK FOR GAZE ACTIVATION

(71) Applicant: Dell Products, LP, Round Rock, TX (US)

(72) Inventors: Deeder M. Aurongzeb, Austin, TX (US); Peng Lip Goh, Singapore (SG)

(73) Assignee: DELL PRODUCTS LP, Round Rock, TX (US)

( * ) Notice: Subject to any disclaimer, the term of this patent is extended or adjusted under 35 U.S.C. 154(b) by 0 days.

(21) Appl. No.: 17/870,287

(22) Filed: Jul. 21, 2022

(65) Prior Publication Data

US 2024/0028110 A1    Jan. 25, 2024

(51) Int. Cl.
| | |
|---|---|
| *G06F 3/01* | (2006.01) |
| *G06F 3/0481* | (2022.01) |
| *G06T 7/70* | (2017.01) |
| *H04R 1/10* | (2006.01) |

(52) U.S. Cl.
CPC .............. *G06F 3/013* (2013.01); *G06F 3/016* (2013.01); *G06F 3/0481* (2013.01); *G06T 7/70* (2017.01); *H04R 1/1008* (2013.01); *H04R 1/1016* (2013.01); *H04R 1/1041* (2013.01); *G06T 2207/30201* (2013.01); *H04R 2420/07* (2013.01)

(58) Field of Classification Search
CPC ........ G06F 3/013; G06F 3/016; G06F 3/0481; G06T 7/70; G06T 2207/30201; H04R 1/1008; H04R 1/1016; H04R 1/1041; H04R 2420/07
See application file for complete search history.

(56) References Cited

U.S. PATENT DOCUMENTS

| | | | | |
|---|---|---|---|---|
| 5,481,622 | A * | 1/1996 | Gerhardt | A61B 3/113 345/158 |
| 6,637,883 | B1 * | 10/2003 | Tengshe | G06V 40/19 351/210 |
| 2015/0091793 | A1 * | 4/2015 | Lee | G06F 3/0485 345/158 |
| 2018/0288516 | A1 * | 10/2018 | Perry | A61B 5/741 |
| 2020/0022577 | A1 * | 1/2020 | Rishoni | G02B 27/0172 |
| 2020/0218341 | A1 * | 7/2020 | Young | G08B 6/00 |
| 2021/0011303 | A1 * | 1/2021 | Andreev | G02B 27/58 |
| 2023/0071037 | A1 * | 3/2023 | Kim | G06F 3/04886 |

* cited by examiner

*Primary Examiner* — Afroza Chowdhury

(74) *Attorney, Agent, or Firm* — Prol Intellectual Property Law, PLLC; H. Kenneth Prol

(57) ABSTRACT

A system and method of executing code instructions of a gaze detection function system comprising a processor executing code instructions of a software application presenting a graphical user interface (GUI) to a user on a display device, a camera for capturing an image of a user, and the gaze detection function system detecting a location of a user's gaze relative to a display device location based on tracking gaze from the image and generating a gaze detection feedback signal sent, and sending the gaze detection feedback signal to a wireless headset device via a wireless radio system to initiate an audio or haptic feedback at the wireless headset device to confirm that the display device location has been identified from the detection of the user's gaze.

20 Claims, 8 Drawing Sheets

SYSTEM AND METHOD FOR HEADSET HAPTIC OR AUDIO CONFIRMATION FEEDBACK FOR GAZE ACTIVATION

FIELD OF THE DISCLOSURE

The present disclosure generally relates to wireless headset devices, such as headphones and earbuds. More specifically, the present disclosure relates to a system for providing haptic or audio feedback via a wireless headset device for confirmation of gaze control systems on an information handling system.

BACKGROUND

As the value and use of information continues to increase, individuals and businesses seek additional ways to process and store information. One option available to clients is information handling systems. An information handling system generally processes, compiles, stores, and/or communicates information or data for business, personal, or other purposes thereby allowing clients to take advantage of the value of the information. Because technology and information handling may vary between different clients or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific client or specific use, such as e-commerce, financial transaction processing, airline reservations, enterprise data storage, or global communications. In addition, information handling systems may include a variety of hardware and software components that may be configured to process, store, and communicate information and may include one or more computer systems, data storage systems, and networking systems. The information handling system may include telecommunication, network communication, video communication capabilities, and audio capabilities. The information handling system may be operatively coupled to one or more peripheral input/output devices such as a keyboard, mouse, touchpad, display device, camera, wearable peripheral device, touchpad, speakers, headset, earbuds, headphones, microphone, or other peripheral devices. Similarly, user may interface with one or more of the peripheral input/output device such as a display device, headset, earbuds, headphones, camera, microphone or other peripheral device to input commands or to receive feedback from operating software applications on the information handling system and which may include gaze detection of a user appearing before a camera and display device.

BRIEF DESCRIPTION OF THE DRAWINGS

It will be appreciated that for simplicity and clarity of illustration, elements illustrated in the Figures are not necessarily drawn to scale. For example, the dimensions of some elements may be exaggerated relative to other elements. Embodiments incorporating teachings of the present disclosure are shown and described with respect to the drawings herein, in which.

The use of the same reference symbols in different drawings may indicate similar or identical items.

DETAILED DESCRIPTION OF THE DRAWINGS

Figure 1:
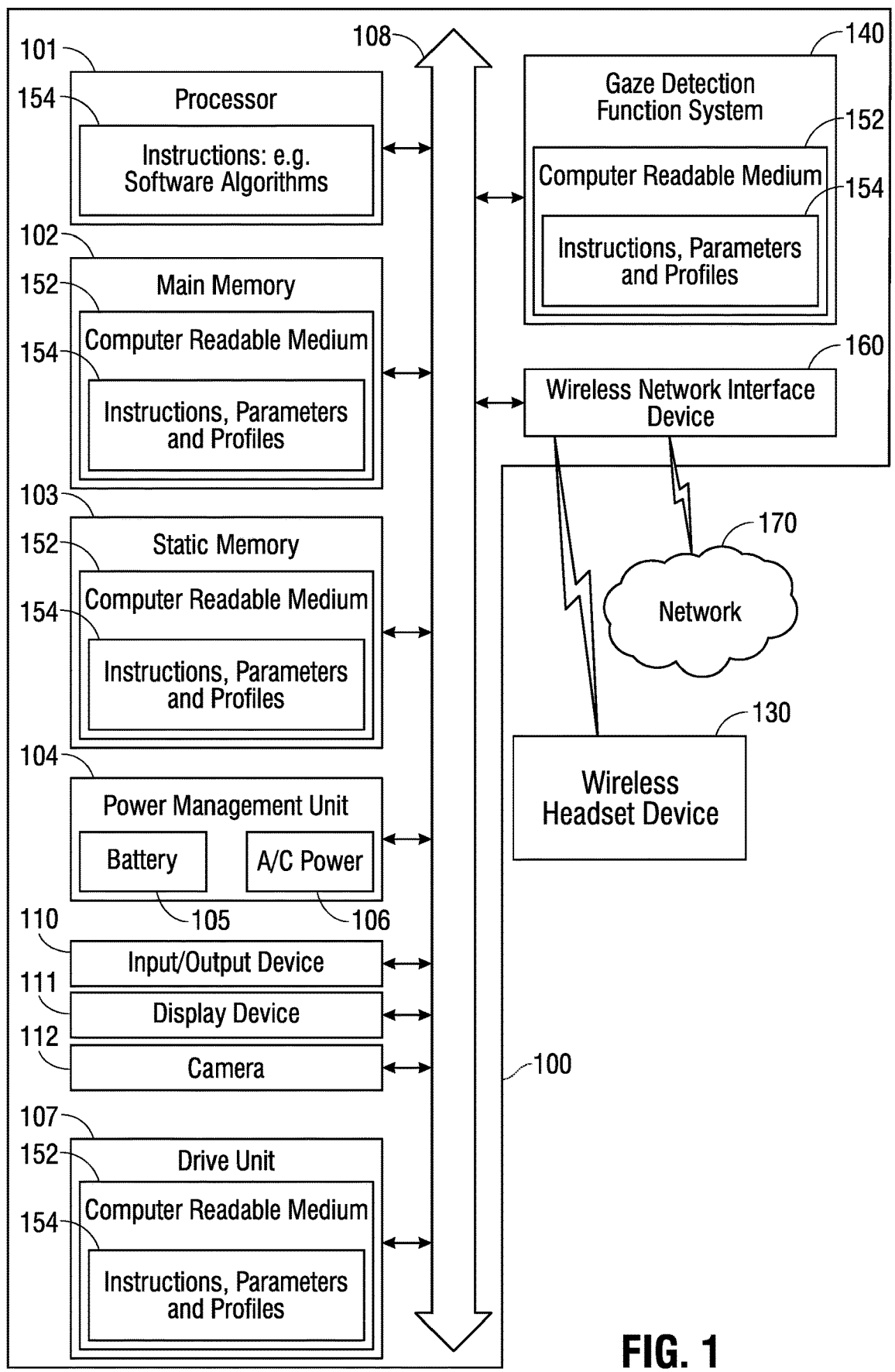
FIG. 1 is a block diagram illustrating an information handling system operatively coupled to a wireless headset device and executing a gaze detection function system according to an embodiment of the present disclosure.

The following description in combination with the Figures is provided to assist in understanding the teachings disclosed herein. The description is focused on specific implementations and embodiments of the teachings, and is provided to assist in describing the teachings. This focus should not be interpreted as a limitation on the scope or applicability of the teachings.

Users of mobile information handling systems such as smart phones, tablets, or laptops may employ one or more peripheral wireless headset devices (e.g., earbuds, headphones, smart speakers) located remotely from the mobile information handling system to transmit and receive streaming audio data such as streaming music, streaming podcasts, phone calls, or online meetings (e.g., through Zoom®, or Microsoft® Teams C)). In some embodiments, a wireless headset device may have plural uses including receiving and transmitting audio data streams for playback of sound or for receiving sound from a microphone. The wireless headset device may have one or more radios to be wirelessly linked to a host information handling systems to receive or transmit audio streams. The wireless headset device (e.g., earbuds or a headphones) may receive audio data streaming input and output from a mobile information handling system as well as command data and signals.

In embodiment of the present disclosure, a mobile information handling system may operate one or more software applications or hardware systems that may present a graphical user interface (GUI) or other graphical content on a display device to a user. The user may interact with the GUI or other graphical content on the display device via one or more of the peripheral input/output (I/O) devices. In this way, the user may interact with the executing software applications, system hardware or data files of the host information handling system as well as any network communications with remotely located software, hardware, or data files. Peripheral I/O devices may include interaction via a mouse, touchpad, touchscreen or other I/O devices. Interaction may also be made via a gaze detection function system that operates with a camera, such as a web camera, as a type of I/O device on the host information handling system to capture images of a user in front of a display screen and to track gaze and actions of that user in interacting with the display screen and any content presented thereon according to embodiments herein. In previous systems, gaze detecting for tracking gaze and user input actions, such as actions indicating selection of a content item or to control reselection of a portion of the display screen content were limited to presentation of feedback on the display screen such as indication of selection. However, due to the shifting of the user or movement of a user's eyes as well as inaccuracies of a gaze tracking system may create issues interacting with a gaze tracking system, the previous systems may be cumbersome. For example, the gaze tracking systems may be delayed in indicating to a user that a display device location has been gazed at, mis-selections may occur and difficult to perceive or correct with gaze, or a user may have difficulty navigating and the gaze tracking system and knowing when the gaze location has been determined or user actions may be received. Such difficulty, in particular, may be with indicating navigation around display device locations and content presented thereon.

The embodiments of the present application describe a gaze detection function system operating on a host information handling system and with a camera located thereon to capture images of a user. The gaze detection function system conducts gaze tracking and detection of user actions and functions as an I/O device or a cursor control system to interact with content displayed on a display screen and with underlying software applications, hardware, or data files. Further, embodiments of the present application describe an audio and haptic feedback control system executing on a microcontroller unit or other processing resource on a headset device (e.g., headphones or earbuds) to drive one or more types of audio feedback at a speaker or haptic feedback at a haptic actuator located in the wireless headset device and assist a user in navigating and interfacing with displayed content via the gaze detection function system. The audio feedback or haptic feedback at the wireless headset device is based on a received gaze detection feedback signal from the gaze detection function system on the host information handling system. Thus, the gaze detection function system according to embodiments of the present disclosure may be used to provide a gaze detection feedback signal sent via wireless link, such as a sideband signal, to a wireless headset device according to embodiments herein.

The gaze detection feedback signal may be one of a plurality of types of gaze detection feedback signals in an embodiment. The gaze detection feedback signal may indicate that the gaze detection function system has identified a display device location on the display screen as a set of candidate gaze coordinates for an area of the display device and presented content. Further, the gaze detection function system may utilize gaze detection feedback signals to the wireless headset device to provide control such as cursor control or control of a direction, such as left/right or up/down, or detection of a user's gaze or actions by the user to interact with content displayed on the display device in an embodiment. In another embodiment, the gaze detection feedback signal may indicate that the gaze detection function system has identified a display device location on the display screen or detection of a user's gaze at a display device location square that to be a cursor location, location of another gaze location indicator on the display device, or is a localized portion within a grid overlayed on the displayed content of the display screen in various embodiments. In further embodiments, the gaze detection feedback signal may indicate confirmation that a cursor location, other gaze location indicator, or a localized grid portion, or a delineated half, quadrant or other part of the display screen has been identified based on gaze tracking. The gaze detection function system may seek for be provided acceptance or rejection of candidate gaze location coordinates and a gaze location area based thereon from the user. Further, the gaze detection function system determine a cursor location or function as a cursor control system with the gaze detection function system on the host information handling system based on iteratively detecting and determining candidate gaze location coordinates and receiving acceptance or rejection from actions detected from the user by the camera system.

In embodiments herein, the gaze detection feedback signal may also identify one or more types of actions by the user made to interact with the gaze detection function system and content displayed on the video display device. In this way, the user may interact with executing software, hardware, or files on the host information handling system via the gaze detection function system as an I/O device to conduct content interactions with the content displayed on the display device. An action by the user may be used to select or otherwise interact with content displayed on the display device, or indicate acceptance or rejection of a display device location determined from gaze tracking to the gaze detection function system. Further the audio or haptic feedback of a wireless headset device may assist a user with using the gaze detection function system to move a cursor, select content items, or execute other functions of displayed content that may be assisted by the gaze detection function system when interacting with the software, hardware or files on the host information handling system. For example, a user may blink or provide a series of blinks, shake her head, nod her head, tilt her head or provide any other gesture with her head, hands, fingers or a device to indicate selection or actuation of a content item displayed on the display screen. The determination of a gaze location on the display device location that is identified by the gaze tracking of the gaze detection function system in some embodiments is used with the haptic or audio feedback provided to the wireless headset device to execute a gaze-based I/O device for the host information handling system in embodiments herein. It is contemplated that any number of blinks, any sequence of blinks, or blinks from just one eye (e.g., a wink), nods, headshakes, tilts, or other gestures may be detected in images captured by the host information handling system camera and processed by the gaze detection function system to detect one or more actions corresponding to acceptance or rejection of candidate gaze location coordinates or corresponding to any of a number of content interfacing actions with display software content. For example, any action including blinking, winking, a user nodding, tilting, or shaking her head or other gesture may be detected and interpreted by the gaze detection function system as an action to interact with the gaze detection function system directly, for confirmation or rejection of display device locations, or to use the gaze detection function system to interact with the software applications, hardware or files on the host information handling system as an I/O input. For actions detected by the gaze detection function system, the gaze detection function system may generate one or more types of gaze detection feedback signals. These plural types of gaze detection feedback signals may be transmitted to the wireless headset device worn by the user and the audio and haptic feedback control system may generate a haptic feedback via a haptic actuator, audio feedback via speaker, or a combination of various types that correspond to the plurality of one or more types of gaze detection feedback signals in embodiments herein. In an example embodiment, a haptic actuator in the ear cups of a headphone type headset may be instructed and driven to vibrate upon display device location detection but click or pulse vibrate plural times upon an action that may be interpreted by the gaze detection function system as a selection of content at the display device location. In another example embodiment, a speaker in the ear cups of a headphone type headset include a haptic feedback indicator audio sound such as a beep or tone that is mixed in with any ongoing active audio data stream upon display device location detection but may issue a distinct tone or audio sound to confirm selection of content at the display device location. A wide variety of audio feedback may be used to correspond to plural types of actions by a user such as one or more beeps or clicks upon an action that may be interpreted by the gaze detection function system as any interaction with displayed software content on a display device that may be conducted via other types of I/O devices such as keyboards, mouse, touchpad, touchscreen or the like. In yet another embodiment, both haptic feedback and audio feedback may be used concurrently or successively in any combination as responsive to a gaze detection feedback signal of one or more types as sent from the gaze detection function system operating at a host information handling system.

The wireless coupling between the wireless headset device and the host information handling systems may be via one or multiple wireless protocols. For example, a pairing and a wireless link may be conducted under a Bluetooth (BT) or Bluetooth Low Energy (BLE) wireless protocol with one or either of the host information handling systems. In another example embodiment, a wireless coupling may be via a dongle on proprietary wireless communication link, via BT, via BLE, via Wi-Fi, or via a 5G wireless link between the wireless headset device and the host information handling systems. Any wireless protocol may be supported and one or more radio systems for plural wireless protocols may be available on the wireless headset device to support one or more wireless links with the host information handling systems in embodiments herein.

FIG. 1 illustrates an information handling system 100 according to several aspects of the present disclosure. In particular for one or more embodiments described herein, an information handling system 100 includes any instrumentality or aggregate of instrumentalities operable to compute, classify, process, transmit, receive, retrieve, originate, switch, store, display, manifest, detect, record, reproduce, handle, or use any form of information, intelligence, or data for business, scientific, control, entertainment, or other purposes. For example, an information handling system 100 may be a personal computer, mobile device (e.g., personal digital assistant (PDA) or smart phone), a server (e.g., blade server or rack server), a wired or wireless docking station for a mobile information handling system, a consumer electronic device, a network server or storage device, a network router, switch, or bridge, wireless router, or other network communication device, a network connected device (cellular telephone, tablet device, etc.), IoT computing device, wearable computing device, a set-top box (STB), a mobile information handling system, a palmtop computer, a laptop computer, a tablet computer, a desktop computer, an augmented reality system, a virtual reality system, a communications device, an access point (AP), a base station transceiver, a wireless telephone, a control system, a camera, a scanner, a printer, a personal trusted device, a web appliance, or any other suitable machine capable of executing a set of instructions (sequential or otherwise) that specify actions to be taken by that machine, and may vary in size, shape, performance, price, and functionality.

In a networked deployment, the information handling system 100 may operate in the capacity of a server or as a client computer in a server-client network environment, or as a peer computer system in a peer-to-peer (or distributed) network environment. In a particular embodiment, the information handling system 100 may be implemented using electronic devices that provide voice, video or data communication and may serve as a host for an active audio data stream for wireless communication to a wireless headset device. For example, an information handling system 100 may be any mobile or other computing device capable of executing a set of instructions (sequential or otherwise) that specify actions to be taken by that machine. Further, while a single information handling system 100 is illustrated, the term "system" shall also be taken to include any collection of systems or sub-systems that individually or jointly execute a set, or multiple sets, of instructions to perform one or more computer functions.

Each information handling system 100 in an embodiment is operably coupled to one or more wireless headset devices 130 and capable of wirelessly receiving and transmitting audio data, such as a voice call or streaming audio content (e.g., podcast, music, etc.) via a link via the wireless network interface device 160 of information handling system 100. In some embodiments, the wireless headset device 130 may comprise a wearable hearing device that a user may position in or around the user's ears, such as earbuds or headphones. As described, an information handling system 100 may be any mobile information handling system, such as a smart phone, tablet, or laptop, operating as a host information handling system to wirelessly link with a wireless headset device 130 and transceive an active audio data stream via that wireless link. Further, command signals may be transmitted between the host information handling system 100 and a wireless headset device 130 on a wireless link, such as in a sideband communication in some embodiments. This command signal communication may include gaze detection feedback signals to the wireless headset device 130 in some example embodiments.

The information handling system 100 may include a memory 102, (with computer readable medium 152 that is volatile (e.g. random-access memory, etc.), nonvolatile memory (read-only memory, flash memory etc.) or any combination thereof), one or more processing resources, such as a central processing unit (CPU), a graphics processing unit (GPU), a Visual Processing Unit (VPU) or a Hardware Accelerator, any one of which may be the processor 101 illustrated in FIG. 1, hardware or software control logic, or any combination thereof. Additional components of the information handling system 100 may include one or more storage devices 103 or 107, a wireless network interface device 160, one or more communications ports for communicating with external devices, as well as various input and output (I/O) devices 110, such as a keyboard, a mouse, touchpad or any combination thereof. A power management unit 104 supplying power to the information handling system 100, via a battery 105 or an alternating current (A/C) power adapter 106 may supply power to one or more components of the information handling system 100, including the processor 101, the wireless network interface device 160, a static memory 103 or drive unit 107 or other components of an information handling system. The information handling system 100 may also include one or more buses (e.g., 108) operable to transmit communications between the various hardware components. Portions of an information handling system 100 may themselves be considered information handling systems 100 in the embodiments presented herein.

The wireless network interface device 160 in an embodiment may be capable of communication between the information handling system and network 170 (e.g., LAN, WLAN, WAN, WLAN) in some embodiments. Further, wireless network interface device 160 may be capable of communication with the paired wireless headset device 130 using a wireless link established using Near Field Communication (NFC), or Bluetooth® technology such as Bluetooth (BT) or Bluetooth Low Energy (BLE) protocols, for example. The wireless network interface device 160 in an embodiment may transmit and receive information necessary to pair the wireless headset device 130 with the information handling system 100, such as, for example, pairing or wireless communication profiles for the host information handling system 100 and the wireless headset device 130. Such pairing or wireless communication profiles may operate to identify the wireless headset device 130 as a device authorized to transceive data with the host information handling system 100, as well as information sufficient to identify the wireless headset device 130, such as a Media Access Control (MAC) address, IP address. The pairing or wireless communication profiles in an embodiment may further store various types of information necessary to perform a handshake between at least one wireless headset device 130 and the host information handling system 100, such as various public keys, private keys, hashing algorithms, short-term keys, long-term keys, or encryption/decryption algorithms. Further, the network interface device 160 in an embodiment may establish a wireless link with the network 170 to conduct an active audio data stream from a remote source such as an ongoing call, virtual meeting, or audio streaming from an online audio streaming service.

Information handling system 100 may include devices or modules that embody one or more of the devices or execute instructions for the one or more systems and modules described herein, and operates to perform one or more of the methods described herein. The information handling system 100 may execute code instructions 154 that may operate on servers or systems, remote data centers, or on-box in individual client information handling systems 100 according to various embodiments herein. In some embodiments, it is understood any or all portions of code instructions 154 may operate on a plurality of information handling systems 100.

The information handling system 100 may include a processor 101 such as a central processing unit (CPU), a GPU, a Visual Processing Unit (VPU), or a hardware accelerator, embedded controllers or control logic or some combination of the same. Any of the processing resources may operate to execute code that is either firmware or software code. Moreover, the information handling system 100 may include memory such as main memory 102, static memory 103, containing computer readable medium 152 storing instructions 154. Instructions 154 may include a gaze detection function system 140, operating system (OS) software, application software, BIOS software, or other software applications or drivers detectable by processor type 101.

The disk drive unit 107 and static memory 103 may also contain space for data storage in a computer readable medium 152. The instructions 154 in an embodiment may reside completely, or at least partially, within the main memory 102, the static memory 103, and/or within the disk drive 107 during execution by the processor 101. The information handling system 100 may also include one or more buses 108 operable to transmit communications between the various hardware components such as any combination of various input and output (I/O) devices 110 including a display device 111, camera 112, keyboard, touchpad, mouse, or the like.

Information handling system 100 in an embodiment may be in communication, via a wireless network interface device, with a wireless headset device 130 such as earbuds or headphones, as described in greater detail herein. The host information handling system 100 in such an embodiment may operate on wired and wireless links to connect with the network 170 via a network Access Point (AP) or base station, as described in greater detail herein.

The network interface device 160 may provide connectivity of the information handling system 100 as a host of at least one active audio data stream to an operatively coupled wireless input/output devices such as wireless headset device 130. For example, the wireless network interface device 160 may establish a wireless link directly to the wireless headset device 130. In some embodiments, another wireless link directly to the wireless headset device 130, or any number of additional wireless links I/O devices 110 may be established in embodiments herein. Such wireless links may be established pursuant to the Bluetooth® or Bluetooth Low Energy® (BLE) protocols, for example. In some embodiments, the Bluetooth® protocols or BLE protocols (e.g., protocols established under the Institute of Electrical and Electronics Engineers protocol 802.15.1) may be used to establish a Private Area Network (PAN) (e.g., 170) in which the information handling system 100 may communicate wirelessly with any wireless headset devices (e.g., 130 and 180) paired to the PAN 170 using a Bluetooth® compliant pairing and wireless communication profile. The PAN 170 in such an embodiment may communicate data between the information handling system 100 and any paired wireless headset devices (e.g., 130 and 180) over short distances using Ultra High Frequency (UHF) radio waves in the Industrial, Scientific, and Medical purposes bands (ISM bands) between 2.402 and 2.48 GHz. Reference to Bluetooth® may refer to either or both of the Bluetooth® or Bluetooth Low Energy (BLE) and any revision of those protocols.

The network interface device 160 may provide connectivity of the information handling system 100 to the network 170 via a dedicated link, to a network AP or base station in an embodiment. In another embodiment, network interface device 160 may provide connectivity of the information handling system 100 to one or more wireless peripheral input/output devices 110 such as a wireless headset device 130. Connectivity to the wireless headset device 130 may be with a headset or earbuds in an example embodiment and may be via a BT or BLE wireless link or a proprietary wireless link such as at 2.4 GHz as well as via any near field communication link or other wireless link to establish a wireless link or a wireless personal area network between the information handling system 100 and one or more wireless peripheral input/output devices 110 such as a wireless headset device 130. The network 170 in some embodiments may be a wired local area network (LAN), a wireless personal area network (WPAN), a wireless Local Area Network (WLAN), such as a public Wi-Fi communication network, a private Wi-Fi communication network, or other non-cellular communication networks. In other embodiments, the network 170 may be a wired wide area network (WAN), a wireless wide area network (WWAN), such as a 4G LTE public network, or a 5G communication network, or other cellular communication networks, including future protocol communication networks such as upcoming 6G protocols under development. Connectivity to any of a plurality of networks 170, one or more APs for those networks, or to a docking station in an embodiment may be via wired or wireless connection.

In some aspects of the present disclosure, the network interface device 160 may operate two or more wireless links. In other aspects of the present disclosure, the information handling system 100 may include a plurality of network interface devices, each capable of establishing a separate wireless link to network 170, such that the information handling system 100 may be in communication with network 170 via a plurality of wireless links.

The network interface device 160 may operate in accordance with any cellular wireless data communication standards. To communicate with a wireless local area network, standards including IEEE 802.11 WLAN standards, IEEE 802.15 WPAN standards, or similar wireless standards may be used. Utilization of radiofrequency communication bands according to several example embodiments of the present disclosure may include bands used with the WLAN standards which may operate in both licensed and unlicensed spectrums. For example, WLAN may use frequency bands such as those supported in the 802.11 a/h/j/n/ac/ax including Wi-Fi 6 and Wi-Fi 6e. It is understood that any number of available channels may be available in WLAN under the 2.4 GHz, 5 GHz, or 6 GHz bands which may be shared communication frequency bands with WWAN protocols in some embodiments.

The network interface device 160, in other embodiments, may connect to any combination of cellular wireless connections including 2G, 2.5G, 3G, 4G, 5G or the like from one or more service providers or privately administered by an enterprise. Utilization of radiofrequency communication bands according to several example embodiments of the present disclosure may include bands used with the WWAN standards, which may operate in both licensed and unlicensed spectrums. More specifically, the network interface device 160 in an embodiment may transceive within radio frequencies associated with the 5G New Radio (NR) Frequency Range 1 (FR1) or Frequency Range 2 (FR2). NRFR1 may include radio frequencies below 6 GHz, also sometimes associated with 4G LTE and other standards predating the 5G communications standards. NRFR2 may include radio frequencies above 6 GHz, made available within the emerging 5G communications standard. Frequencies related to the 5G networks may include high frequency (HF) band, very high frequency (VHF) band, ultra-high frequency (UHF) band, L band, S band, C band, X band, Ku band, K band, Ka band, V band, W band, and millimeter wave bands.

In some embodiments, software, firmware, dedicated hardware implementations such as application specific integrated circuits, programmable logic arrays and other hardware devices may be constructed to implement one or more of some systems and methods described herein. Applications that may include the apparatus and systems of various embodiments may broadly include a variety of electronic and computer systems. One or more embodiments described herein may implement functions using two or more specific interconnected hardware modules or devices with related control and data signals that may be communicated between and through the modules, or as portions of an application-specific integrated circuit. Accordingly, the present system encompasses software, firmware, and hardware implementations.

In accordance with various embodiments of the present disclosure, the methods described herein may be implemented by firmware or software programs executable by a controller or a processor system. Further, in an exemplary, non-limited embodiment, implementations may include distributed processing, component/object distributed processing, and parallel processing. Alternatively, virtual computer system processing may be constructed to implement one or more of the methods or functionalities as described herein.

The present disclosure contemplates a computer-readable medium that includes instructions, parameters, and profiles 154 or receives and executes instructions, parameters, and profiles 154 responsive to a propagated signal, so that a device connected to a network 170 may communicate voice, video or data over the network 170. Further, the instructions 154 may be transmitted or received over the network 170 via the network interface device 160. The information handling system 100 may include a set of instructions 154 that may be executed to cause the computer system to perform any one or more of the methods or computer-based functions disclosed herein. For example, instructions 154 may include a particular example of a gaze detection function system 140, or other aspects or components. Various software modules comprising application instructions 154 may be coordinated by an operating system (OS), and/or via an application programming interface (API). An example operating system may include Windows®, Android®, and other OS types. Example APIs may include Win 32, Core Java API, or Android APIs. Application instructions 154 may also include any application processing drivers, or the like executing on information handling system 100.

A gaze detection function system 140 may utilize a computer-readable medium 152 in which one or more sets of instructions 154 may operate in part as software or firmware instructions executed on the information handling system 100. The instructions 154 may embody one or more of the methods or logic as described herein. For example, instructions relating to the gaze detection function system 140, firmware or software algorithms, processes, and/or methods may be stored here and may execute to establish an input/output interface for a user by conducting gaze detection and tracking via a camera capturing images of a user in coordination via wireless network interface device 160 with a wireless headset device 130 according to embodiments herein. More specifically, instructions 154 may be executed by the processor 101 or other processing resources such as an embedded controller (EC), or other processing resource to capture images of a user via a camera and determine from images of the user's eyes, including pupils or Purkinje images, a gaze and conduct gaze tracking relative to locations on the video display device 111 according to embodiments herein. With such gaze detection and tracking, the gaze detection function system 140 may determine a section of the display screen being gazed at, a localized block of the display screen, or a particular location area for locating a cursor in some example embodiments. With determination of a display device location being gazed at by the gaze detection function system 140, the gaze detection function system 140 may generate a gaze detection feedback signal or transmission to wireless headset device 130. Such instructions 154 may also comprise determining a user action from capture images including a blink, wink, head nod, head shake, head tilt or other movement of a user's eyes, face or head to indicate an action with respect to the gaze detection function system 140 identification of a display device location via confirmation or rejection of the same, or for selecting displayed content at the display device location or causing another action to occur with a GUI presented there. Again, the gaze detection function system 140 may transmit one of several types of gaze detection feedback signals, in some embodiments, to a wireless headset device 130 for an audio or haptic feedback confirming the action is received by the host information handling system 100. The instructions 154 may further operate to perform various requirements for transmitting gaze detection feedback signals on a wireless link, such as on a sideband channel, including types of handshakes or encryption/decryption using various public keys, private keys, hashing algorithms, short-term keys, long-term keys, or encryption/decryption algorithms stored in the shared pairing or wireless communication profiles. Moreover, the network interface device 160, in an embodiment, may execute code instructions 154 to establish a wireless link with the network 170 to receive, in some embodiments, an external active audio data stream from a remote source such as a call, virtual meeting or an online streaming service as well as establish a wireless link with wireless headset device 130 for user to receive or interact with an active audio data stream.

Main memory 102 may contain computer-readable medium (not shown), such as RAM in an example embodiment. An example of main memory 102 includes random access memory (RAM) such as static RAM (SRAM), dynamic RAM (DRAM), non-volatile RAM (NV-RAM), or the like, read only memory (ROM), another type of memory, or a combination thereof. Static memory 103 may contain computer-readable medium (not shown), such as NOR or NAND flash memory in some example embodiments. The instructions, parameters, and profiles 154 of the gaze detection function system 140 may be stored in static memory 103, or the drive unit 107 on a computer-readable medium 152 such as a flash memory or magnetic disk in an example embodiment. More specifically, computer readable medium 152 in an embodiment may store calibration factors as well as captured images of a user from a camera, such as a webcam, for use with the gaze detection function system 140 for identifying the gaze direction, actions by the user, and to conduct gaze tracking and display device locations for providing an I/O system for a user to interact with the content displayed on display device 111. The pairing or wireless communication profiles in an embodiment may further store various types of information necessary for a wireless link such as that to perform a handshake between the wireless headset device 130 and the information handling system 100, such as various public keys, private keys, hashing algorithms, short-term keys, long-term keys, or encryption/decryption algorithms. After establishing a wireless link in an embodiment, the host information handling system 100 may begin transmitting gaze detection feedback signals as well as transceiving one or more active audio data streams with the first wireless headset device 130. Upon receiving gaze detection feedback signals at the wireless headset device 130, the wireless headset device 130 may generate audio feedback mixed into an audio data stream at a speaker, a haptic feedback from a haptic actuator, or some combination in various embodiments. Further, the type of audio feedback or haptic feedback may depend on an identification of a type of gaze detection feedback signal received at the wireless headset device 130 from the gaze detection function system 140. A variety of audio or haptic feedback options are contemplated to confirm gaze tracking of location, to confirm actions by a user to accept or reject gaze tracking display device location, and to confirm actions by a user to interact with content displayed at display device location identified by the gaze detection function system 140 through gaze tracking.

While the computer-readable medium is shown to be a single medium, the term "computer-readable medium" includes a single-medium or multiple-media, such as a centralized or distributed database, and/or associated caches and servers that store one or more sets of instructions. The term "computer-readable medium" shall also include any medium that is capable of storing, encoding, or carrying a set of instructions for execution by a processor or that cause a computer system to perform any one or more of the methods or operations disclosed herein.

In a particular non-limiting, exemplary embodiment, the computer-readable medium may include a solid-state memory such as a memory card or other package that houses one or more non-volatile read-only memories. Further, the computer-readable medium may be a random-access memory or other volatile re-writable memory. Additionally, the computer-readable medium may include a magneto-optical or optical medium, such as a disk or tapes or other storage device to store information received via carrier wave signals such as a signal communicated over a transmission medium. Furthermore, a computer readable medium may store information received from distributed network resources such as from a cloud-based environment. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

In some embodiments, dedicated hardware implementations such as application specific integrated circuits, programmable logic arrays and other hardware devices may be constructed to implement one or more of the methods described herein. Applications that may include the apparatus and systems of various embodiments may broadly include a variety of electronic and computer systems. One or more embodiments described herein may implement functions using two or more specific interconnected hardware modules or devices with related control and data signals that may be communicated between and through the modules, or as portions of an application-specific integrated circuit. Accordingly, the present system encompasses software, firmware, and hardware implementations.

When referred to as a "system", a "device," a "module," a "controller," or the like, the embodiments described herein may be configured as hardware. For example, a portion of an information handling system device may be hardware such as, for example, an integrated circuit (such as an Application Specific Integrated Circuit (ASIC), a Field Programmable Gate Array (FPGA), a structured ASIC, or a device embedded on a larger chip), a card (such as a Peripheral Component Interface (PCI) card, a PCI-express card, a Personal Computer Memory Card International Association (PCMCIA) card, or other such expansion card), or a system (such as a motherboard, a system-on-a-chip (SoC), or a standalone device). The system, device, controller, or module may include software, including firmware embedded at a device, such as an Intel® Core class processor, ARM® brand processors, Qualcomm® Snapdragon processors, or other processors and chipsets, or other such device, or software capable of operating a relevant environment of the information handling system. The system, device, controller, or module may also include a combination of the foregoing examples of hardware or software. In an embodiment an information handling system 100 may include an integrated circuit or a board-level product having portions thereof that may also be any combination of hardware and software. Devices, modules, resources, controllers, or programs that are in communication with one another need not be in continuous communication with each other, unless expressly specified otherwise. In addition, devices, modules, resources, controllers, or programs that are in communication with one another may communicate directly or indirectly through one or more intermediaries.

Figure 2:
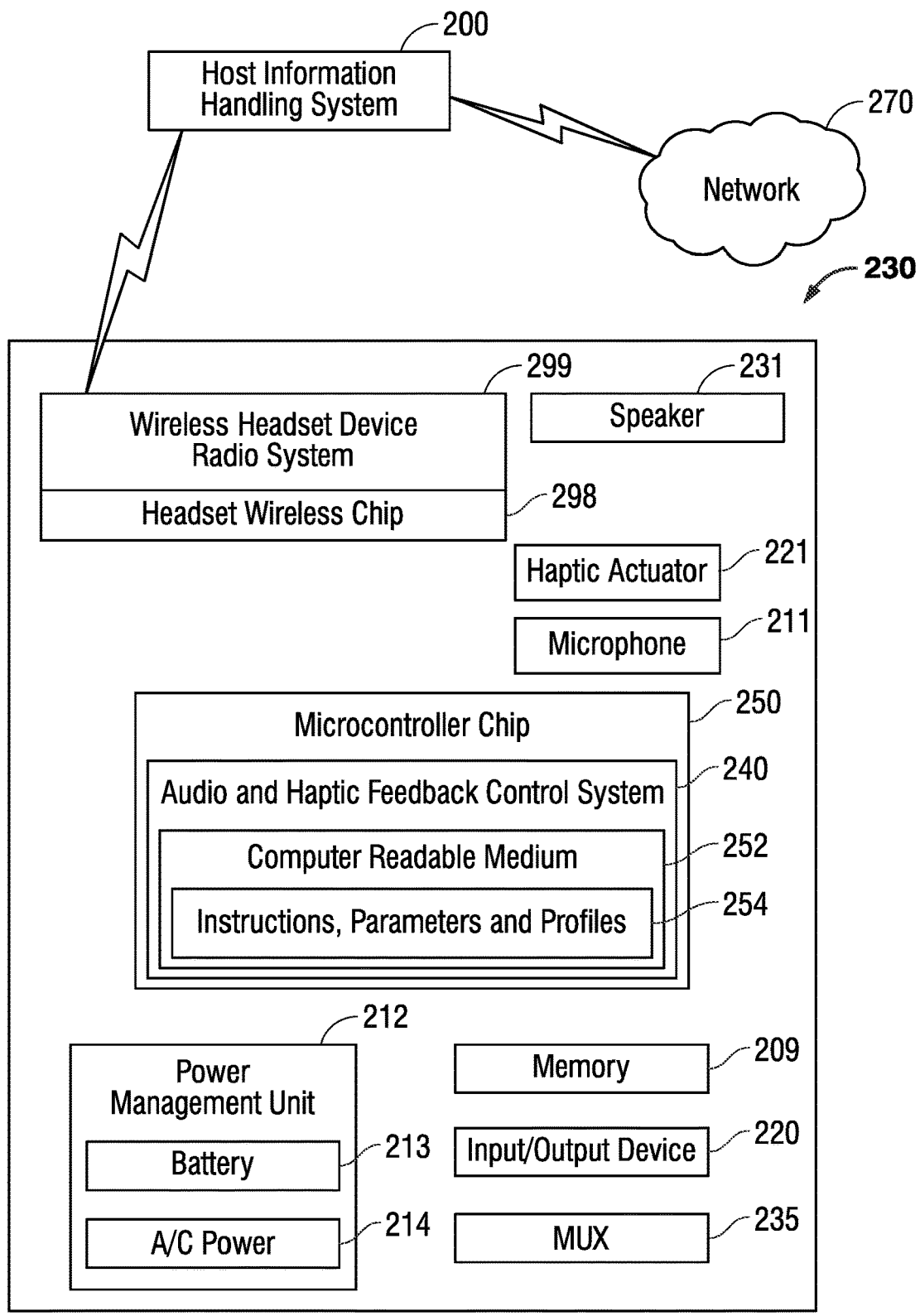
FIG. 2 is a block diagram illustrating a wireless headset device wirelessly coupled to a host information handling system and executing an audio and haptic feedback control system according to an embodiment of the present disclosure.

FIG. 2 is a block diagram illustrating a wireless headset device 230 operably coupled to a host information handling systems 200 according to an embodiment of the present disclosure. The host information handling system 200 in an embodiment is operably coupled to a wireless headset device 230 capable of wirelessly receiving and transmitting an active audio data stream, such as a voice call or streaming audio content (e.g., podcast, music, etc.) via a link with the wireless headset device radio system 299. The host information handling systems 200 may also be wirelessly coupled to network 270 for receiving or transmitting active audio data streams, such as a video conference call, a voice call, or streaming audio content via network 270 in some embodiments.

In an embodiment of the present disclosure, the wireless headset device 230 may also receive commands, such as one or more gaze detection feedback signals from the host information handling system 200 executing code instructions of a gaze detection function system according to embodiments herein. The gaze detection feedback signals may contain metadata or another indicator of a type of audio feedback, haptic feedback, or combination feedback that the audio and haptic feedback control system 240 may interpret and reference with types in memory to generate or retrieve from memory the appropriate audio feedback, haptic feedback, or combination feedback. The wireless headset device 230 may comprise a wearable hearing device that a user may position in or around the user's ears, such as earbuds or headphones. Such a wireless headset device 230 in an embodiment may house a microphone 211 for recording a user's voice and a speaker 231 for outputting or playing audio data received from the host information handling system 200. Speaker 231 may be used to mix an audio feedback of any type from a received gaze detection feedback signal into an audio data stream or to play the same when no active audio data stream is ongoing in some embodiments.

Further, the wireless headset device 230 may include one or more haptic actuators 221 in an embodiment to provide haptic feedback to the wearer of the wireless headset device 230. The haptic actuators 221 may be a piezo actuator element, a linear resonant actuator, eccentric rotating mass motor, or other types of haptic actuators in some embodiments. The haptic actuator or actuators 221 may be located within a housing of the wireless headset device 230 such as a body of a headphone or an earbud in an embodiment. The haptic actuator or actuators 221 may be located in an ear cup cushion of a headphone type wireless headset device 230 in another embodiments. The haptic actuator or actuators 221 are used to provide haptic feedback of a variety of types to a user wearing the wireless headset device 230 based on received gaze detection feedback signal in some embodiments.

A power management unit 212 with a battery 213 or A/C power charging adapter 214 may be on the wireless headset device 230 to provide power to the microcontroller chip 250, the speaker 231, haptic actuator 221, the microphone 211, a switch 233, a multiplexer (MUX) chip 235, a headset wireless chip 298, the wireless headset device radio system 299, an analog or digital switch, or other components of the wireless headset device 230. An input/output device 220, such as a push button, a voice assistant, digital display, capacitive or resistive touch switch, or physical switch, for example, may allow the user to activate the wireless headset device 230 or to control mute or volume provided to the speaker 231 and microphone 211 of the wireless headset device 230.

In an embodiment, the wireless headset device 230 may include a microcontroller integrated circuit chip 250 that may be any device or devices that execute instructions, parameters, and profiles 254 and may have associated computer readable medium 252 for storage of code instructions of an audio and haptic feedback control system 240 to facilitate generating and causing audio feedback, haptic feedback, or some combination of various types. The types of feedback are provided to the user of the wireless headset device 230 in response to received gaze detection feedback signals from the gaze detection function system at the host information handling system 200. More specifically, instructions 254 may be executed by the microcontroller chip 250, for example a controller integrated circuit, to generate an audio feedback based on the received gaze detection feedback signal and cause the MUX 235 to mix the audio feedback signal to be played at speaker 231 in an embodiment. In some embodiments, this may occur while an active audio data stream is being played at the speaker 231 or no active audio data stream may be playing at speaker 231. The inserted audio feedback may be a beep or series of beeps or any tone at speaker 231 and multiplexed into the first active audio data stream, if any, with multiplexer 235 in various embodiments. In another embodiment, instructions 254 may be executed by the microcontroller chip 250, for example a controller integrated circuit, to generate a haptic feedback based on the received gaze detection feedback signal and cause the haptic actuator to generate one or more haptic effects as feedback that may be felt by the wearer of the wireless headset device 230 according to embodiments of the present disclosure. The haptic feedback may be a buzz, click, or series of plural pulsed buzzes or clicks or other haptic responses at haptic actuator 221 in various embodiments. As described, the gaze detection feedback signal may be of a plurality of types utilized by the gaze detection function system at the host information handling system 200 to confirm gaze tracking and to confirm various actions detected by a user utilizing the gaze detection function system to interact with content on a display device of a host information handling system. The type of gaze detection feedback signal may determine the type of audio feedback, haptic feedback, or combination generated by the audio and haptic feedback controller 240 according to embodiments herein.

The wireless headset device radio system 299 may provide connectivity of the wireless headset device 230 to the host information handling system 200, 201 via one or more wireless links. For example, the wireless headset device radio system 299 may establish a wireless link directly to the host information handling system 200 and such wireless links may be established pursuant to the Bluetooth® or Bluetooth Low Energy (BLE) protocols, for example. In some embodiments, the Bluetooth® protocols or BLE protocols (e.g., protocols established under the Institute of Electrical and Electronics Engineers protocol 802.15.1) may be used to establish a Private Area Network (PAN) in which the wireless headset device 230 may communicate wirelessly with the host information handling system 200.

Memory 209 may contain computer-readable medium (not shown), such as RAM in an example embodiment. An example of memory 209 includes random access memory (RAM) such as static RAM (SRAM), dynamic RAM (DRAM), non-volatile RAM (NV-RAM), or the like, read only memory (ROM), another type of memory, or a combination thereof. Memory 209 may also comprise static memory containing computer-readable medium (not shown), such as NOR or NAND flash memory in some example embodiments. The instructions, parameters, and profiles 254 of the audio and haptic feedback control system 240 may be stored in memory 209 on a computer-readable medium 252 such as a flash memory or magnetic disk in an example embodiment.

Figure 3:
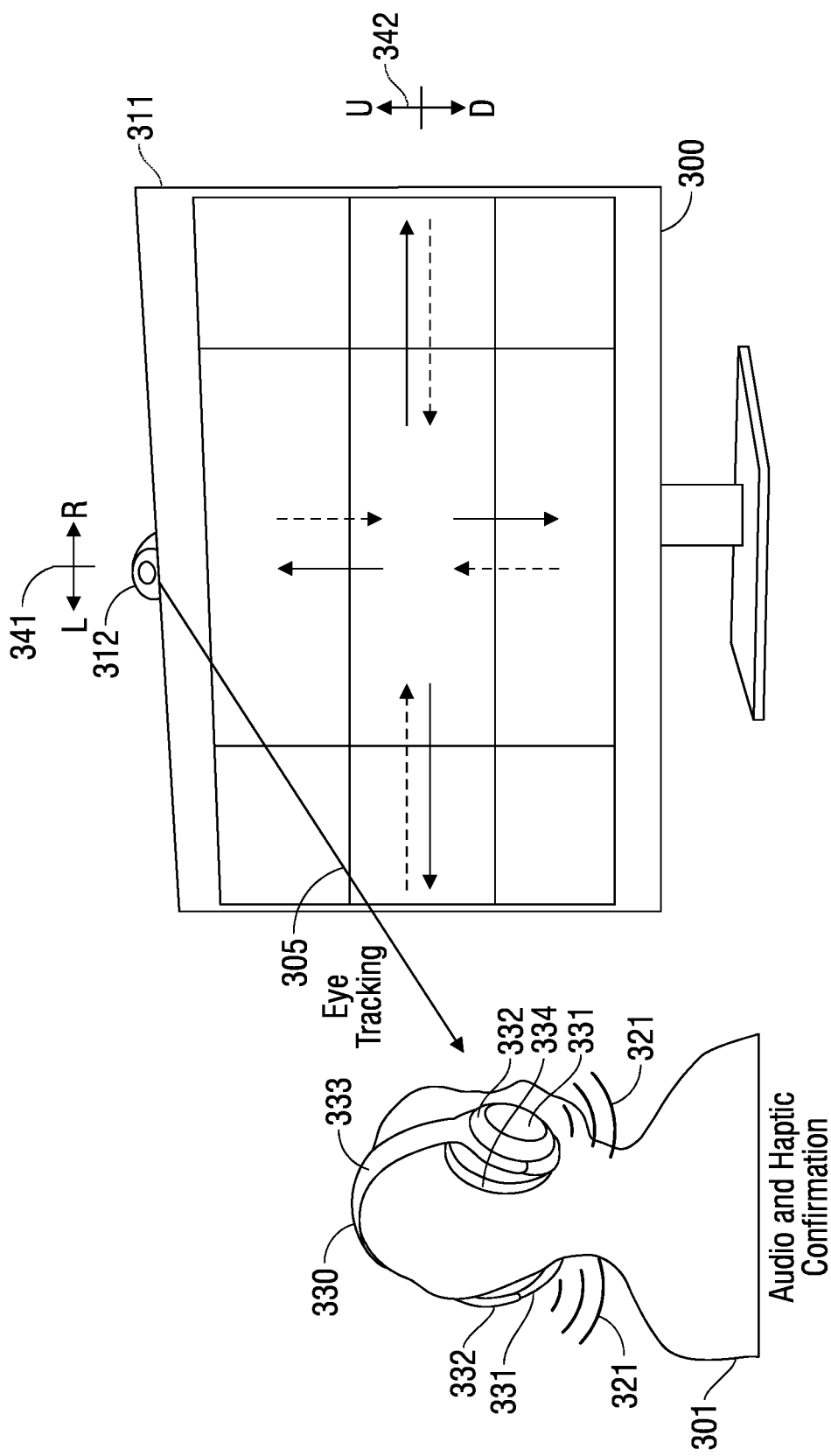
FIG. 3 is a graphical diagram illustrating a wireless headset device wirelessly coupled to a host information handling system and used to provide audio or haptic feedback with a gaze detection function system according to an embodiment of the present disclosure.

FIG. 3 is a graphical diagram illustrating a wireless headset device coupled to a host information handling system to provide audio feedback or haptic feedback to a user via a gaze detection function system according to an embodiment of the present disclosure. FIG. 3 shows a user 301 wearing a wireless headset device 330 an interacting with a gaze detection function system executing on host information handling system 300. The wireless headset device 330 may be a headphone set as shown and include one or more speakers 331 located in earcups 332 of the headphones 330. The speakers 331 may be used to play an active audio data stream received wirelessly as well as provide audio feedback pursuant to gaze detection feedback signals received from a gaze detection function system operating at the host information handling system 300. The earcups 332 may be connected with a headband 333 that fits over a user's head. Further, one or more haptic actuators may be located in the headset 330. The haptic actuators may provide haptic feedback 321 according to embodiments herein. The haptic actuator or actuators may be located in the housing of the headset at the earcups 332 containing the speakers 331, in the headband 333, or in earcup cushions 334 that rest against the user's head and encompass the user's ears in various embodiments. The haptic actuators may be used to generate haptic feedback 321 pursuant to gaze detection feedback signals received from a gaze detection function system operating at the host information handling system 300.

The wireless headset device may also be a set of earbuds in another example embodiment (not shown). The earbuds may each contain a speaker 332 and may each have a haptic actuator located within a housing of the earbud in an example embodiment. Each earbud in a pair of earbuds may be wirelessly coupled to transmit audio data streams between them such as from the host information handling system in an example embodiment. Further, the earbuds may also be wirelessly connected to transceive gaze detection feedback signals received from the gaze detection function system in embodiments herein to provide audio feedback or haptic feedback via the earbuds.

The host information handling system 300 may be a laptop, a tablet, a desktop computing system, an all-in-one or other type of information handling system as described in embodiments herein. The host information handling system 300 may include a display device 311 in which one or more software applications, hardware, or data files may be presented as content to a user with content items such as GUIs, windows, icons, or others. As described in embodiments herein, to interact with content, such as GUIs, windows, icons or the like, on the display device 311, a gaze detection function system operates at the host information handling system 300 in embodiments herein. The gaze detection function system may operate to determine, by gaze tracking or eye tracking 305, a display device location being looked at in an example embodiment. The gaze tracking or eye tracking 305 captures one or more images of a user 301, and particularly a portion of the image to include the eyes, pupils, or a Purkinje image of the eyes of user 301 in embodiments herein. The user's image or images may be captured via a camera 312, such as a web camera, located such that a view of a user including the user's face and eyes may be achieved. Upon determining a display device location being gazed at with eye tracking or gaze tracking 305, the gaze detection function system may send a gaze detection feedback signal to the wireless headset device 330 to provide audio feedback, haptic feedback, or some combination according to embodiments herein. Further, camera 312 may capture a series of images that may be used by the gaze detection function system to determine if an action has been performed by the user 301. For example, the user may blink, wink, tilt her head, nod her head, shake her head, or may gesture with a hand, finger or other body part or object as an action to interact with the gaze detection function system. The action may provide acceptance or rejection of the display device location determined as a candidate gaze location coordinates or an area of pixels around candidate gaze location coordinates in one embodiment. The action may be a content interface action in another embodiment to provide a selection of a content item, such as a window, icon, GUI element, or other content presented via the display device 311 in another embodiment. In yet another embodiment, the content interface action may indicate the user wants to perform a particular action or input to the host information handling system via the content presented on the display device 311. These various actions by the user may cause the gaze detection function system to send varying types of gaze detection feedback signals that correspond to various actions detected by the gaze detection function system. The type of gaze detection feedback signals is determined by the audio and haptic control system on the wireless headset device 330 in embodiments herein. Depending on the type of gaze detection feedback signal received, the microcontroller executing the audio and haptic control system may generate a corresponding type of audio feedback, haptic feedback, or combination feedback at the wireless headset device.

In the shown embodiment, a user 301 wearing the wireless headset device 330 may determine to select a localized portion of the content displayed on the display device 311 and thus may gaze at that portion of the display device 311. In such an embodiment, the gaze detection function system may detect localized portions of the display device 311 that are split into halves including a Left/Right (L-R) determination 341. In another embodiment, the gaze detection function system may detect localized portions of the display device 311 that are split into halves including an Up/Down (U-D) determination 342. Such halves may be used to select among content items, such as windows, located on one half versus the other half. For example, a first window may be displayed on a left side of display device 311 and a second window may be displayed on a right side of display device 311 in an embodiment. A user may gaze at the left side of display device 311 and the gaze detection function system identify by the gaze tracking 305 that the left side is being looked at. The gaze detection function system may generate a first gaze detection feedback signal and send it to wireless headset device 330 for a first audio or first haptic feedback to be generated by the audio and haptic feedback control system with either the speaker or haptic actuator thereon as confirmation gaze detection identification feedback. The gaze detection function system may also detect via one or more images captured by camera 312 that the user 301 executes an action such as some type of gesture including a blink, wink, head nod, head shake, head tilt, or a gesture with a hand, finger or other in some embodiments. The gaze detection function system may generate a second gaze detection feedback signal and send it to wireless headset device 330 for a second audio or second haptic feedback to be generated by the audio and haptic feedback control system with either the speaker or haptic actuator thereon as confirmation feedback of the action detected by the gaze detection function system in another embodiment. Another time period may be monitored by the gaze detection function system to determine when a user changes gaze direction to indicate that a new gaze location is being selected by the user. For example, when a user changes gaze direction, such that the gaze detection function system determines new candidate gaze location coordinates, the gaze detection function system may require that the gaze be turned away for a time period threshold before determining a new eye position and new gaze direction for the new gaze location coordinates on the display device. Such a change location time period threshold duration may be any duration, but may be 0.5-5 seconds in one example embodiment.

In yet another embodiment, after the first gaze detection signal is sent to the user 301 to deliver audio or haptic feedback, the gaze detection function system may determine after a time period has expired that the user still gazes at the left half of the display screen and intends to select the displayed content there, such as the first window. In such an embodiment, the gaze detection function system may auto select the first window located on the left side of the display device based on a timeout of the time period that the user has gazed at that localized side of the display screen. The time period may be any length, but may be limited to not being too long such that a user would not change gaze because of distraction or waiting too long in some embodiments.

It is contemplated that the above embodiments of gaze or eye tracking 305 for selection of a localized half of the content displayed on a half of the display device 311 may also be applied by the gaze detection function system to the up-down localized partition 342 of the display device 311 for gaze tracking 305 may be used. Further, it is appreciated that the display screen 311 may be separated into quadrants such that both the left-right partition 341 and the up-down partition 342 may be used for gaze or eye tracking 305 to select content displayed and located on the display device 311 in the detected quadrant by the gaze detection function system of host information handling system 300. Confirmation of gaze determination of display device location as well as confirmation of any actions detected by the gaze detection function system via images captured via camera 312 may generate one or more types of gaze detection feedback signals. The gaze detection feedback signals may indicate to the microcontroller unit on the wireless headset device to generate audio feedback via speakers 331 or haptic feedback 321 via haptic actuators of the wireless headset device according to various embodiments described herein. For example, content items, such as windows, may be displayed at a particular quadrant localized portion of the display device 311 and the gaze detection function system may detect by gaze or eye tracking which quadrant (L-U, L-D, R-U, or R-D) is being gazed at and identify the content item displayed there in an embodiment. A first gaze detection feedback signal may be sent to generate confirmation audio feedback or haptic feedback of the detection of the display device location and quadrant being looked at by the user 301. In a further example embodiment, the gaze detection function system detect an action as described in embodiments herein and may generate a second gaze detection feedback signal and send it to wireless headset device 330 for a second audio or second haptic feedback to be generated by the audio and haptic feedback control system to confirm the action whether it is an action to accept or reject a quadrant determination or a selection of a content item or another content interface action with a content item according to embodiments described herein. Further, a time period may expire to determine selection of content in a quadrant according to other embodiments herein. Additionally, a change gaze location time period threshold may be used to determine when to re-determine gaze location coordinates after a user is detected as having changed a gaze direction for the threshold change gaze location time period threshold according to an embodiment.

Figure 4:
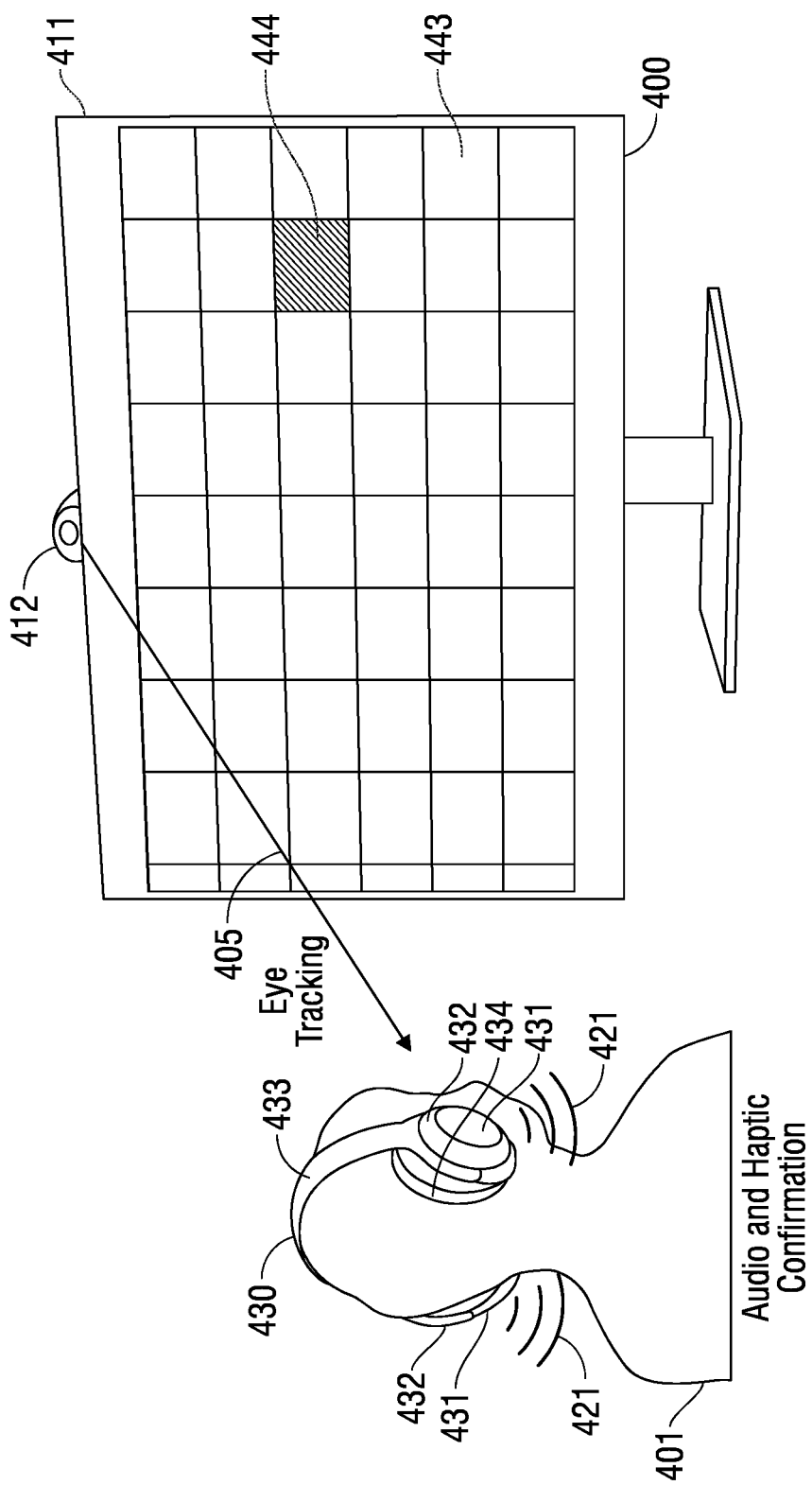
FIG. 4 is a graphical diagram illustrating a wireless headset device wirelessly coupled to a host information handling system and used to provide audio or haptic feedback with a gaze detection function system according to another embodiment of the present disclosure.

FIG. 4 is a graphical diagram illustrating a wireless headset device coupled to a host information handling system and to provide audio feedback or haptic feedback to a user via a gaze detection function system detecting localization zones of a gaze location grid established across content displayed on a display device according to an embodiment of the present disclosure. FIG. 4 shows a user 401 wearing a wireless headset device 430 an interacting with a gaze detection function system executing on host information handling system 400 similar to FIG. 3 above. The wireless headset device 430 may be a headphone set as shown and include one or more speakers 431 located in earcups 432 of the headphones 430. The speakers 431 may be used to play an active audio data stream received wirelessly as well as provide audio feedback pursuant to gaze detection feedback signals received from a gaze detection function system operating at the host information handling system 400. The earcups 432 may be connected with a headband 433 that fits over a user's head. Further, one or more haptic actuators may be located in the headset 430. The haptic actuators may provide haptic feedback 421 according to embodiments herein. The haptic actuator or actuators may be located in the housing of the headset at the earcups 432, in the headband 433, or in earcup cushions 434 that rest against the user's head and encompass the user's ears in various embodiments. The haptic actuators may be used to generate haptic feedback 421 pursuant to gaze detection feedback signals received from a gaze detection function system operating at the host information handling system 400 according to various embodiments described herein.

The wireless headset device may also be a set of earbuds in another example embodiment (not shown). The earbuds may each contain a speaker and may each have a haptic actuator located within a housing of the earbud in an example embodiment. Each earbud in a pair of earbuds may be wirelessly coupled to transmit audio data streams between them from the host information handling system in an example embodiment. Further, the earbuds may also be wirelessly connected each other to receive and pass along from a primary earbud to a second earbud, where applicable, gaze detection feedback signals from the gaze detection function system in embodiments herein to provide audio feedback or haptic feedback via the earbuds.

As described with FIG. 3, FIG. 4 shows a host information handling system 400. Host information handling system 400 may be a laptop, a tablet, a desktop computing system, an all-in-one or other type of information handling system as described in embodiments herein. The host information handling system 400 may include a display device 411 in which one or more software applications, hardware, or data files may present content to a user with content items such as GUIs, windows, icons, or others. As described in embodiments herein, to interact with content, such as GUIs, windows, icons or the like, on the display device 411, a gaze detection function system operates at the host information handling system 400 according to embodiments herein. The gaze detection function system may operate to determine, by gaze tracking or eye tracking 405, a display device location that corresponds to a portion of the display device 411 being looked at in an example embodiment. The gaze tracking or eye tracking 405 utilizes camera 412 to capture one or more images of a user 401, and particularly a portion of the image to include the eyes, pupils, or a Purkinje image of the eyes of user 401 in embodiments herein.

In the shown embodiment, a user 401 wearing the wireless headset device 430 may determine to select a localized portion 444 of the content displayed on the display device 411 and thus may gaze at that portion of the display device 411. In a particular embodiment as shown in FIG. 4, the display device 411 display of content may be segmented into a grid 443 of plural localized portions 444 such as grid squares although any shape of localized portions is contemplated including rectangles or other geometric or even rounded portions. In an example embodiment, the localized portions 444 of grid 443 may be 4-inch by 4-inch squares or may be 3-inch by 4-inch rectangles in another embodiment. Any dimension may be utilized in various embodiments. Smaller localized portions 444 of grid 443 may provide greater accuracy in gazing at content on a specific part of display screen 411, but may be less accurate in selection of the correct localized portion 444 as corresponding to a set of candidate gaze location coordinates when gaze or eye tracking 405 is conducted by the gaze detection function system.

In an embodiment according to FIG. 4, the gaze detection function system may detect localized portions 444 among a plurality of localized portions in grid 443 of the display device 411. In an embodiment, the gaze detection function system may determine the display device location being gazed at via gaze or eye tracking 405 and determine which localized portion 444, or which grid segment, corresponds to the display device location. In one embodiment, the gaze detection function system may cause the corresponding localized portion 444 or grid segment to be highlighted for the user to understand which grid segment has been identified as being gazed at. The gaze detection function system may generate a first gaze detection feedback signal and send it to wireless headset device 430 for a first audio or first haptic feedback to be generated by the audio and haptic feedback control system with either the speaker or haptic actuator thereon as confirmation gaze detection identification feedback that a localized portion 444 has been identified. This audio feedback or haptic feedback may be provided concurrently or instead of highlighting the localized portion 444 on the display screen. Further, the localized portion 444 may correspond with a content element being displayed on the display device 411. For example, the localized portion 444 may correspond with one or more icons or may fall on a window or other GUI content element.

The gaze detection function system may also detect via one or more images captured by camera 412 that the user 401 executes an action such as some type of gesture including a blink, wink, head nod, head shake, head tilt, or a gesture with a hand, finger or other object in some embodiments. The gaze detection function system may generate a second gaze detection feedback signal and send it to wireless headset device 430 for a second audio or second haptic feedback to be generated by the audio and haptic feedback control system with either the speaker or haptic actuator thereon as confirmation feedback of the action detected by the gaze detection function system in another embodiment. In one example embodiment, the action may be a selection between two actions, such as one blink versus two successive blinks, to indicate either an acceptance of the identified or highlighted localized portion 444 of the display device 411 as it corresponds to the user's actual gaze location, or rejection of the identified or highlighted localized portion 444. If accepted, this may cause a content item to be selected or available for selection by another action of the user that may be captured by camera images and identified by the gaze detection function system in some embodiments. If rejected, the gaze detection function system may reset and re-assess eye or gaze tracking, and may even recalibrate, to re-determine a different localized portion 444 of grid 443 on display device 411. In yet another embodiment, after the first gaze detection signal is sent to the user 401 to deliver audio or haptic feedback, and the user does not alter gaze on the localized portion 444 identified, the gaze detection function system may determine after a time period has expired that the user intends to select the displayed content in localized portion 444, such as selection of a first icon or window. In such an embodiment, the gaze detection function system may auto select the first icon or window located at localized portion 444 at least in part based on a timeout of the time period that the user has gazed at that localized portion 444 of the display device 411. The time period may be any length, but may be limited to not being too long such that a user would not change gaze because of distraction or waiting too long in some embodiments.

In other embodiments, an action by a user 401 and captured by camera 412 may be identified by the gaze detection function system and determined to be a content interface action with the content displayed at the localized portion 444 identified via eye or gaze tracking 405. For example, an action may be a select action to open or cause another action in the operating software, hardware or to a data file that is represented by content displayed at the localized portion 444 on the display device 411. For example, the content interface action detected by the gaze detection function system may be for selection of an icon at localized portion 444 to open a software application or selection of a function softkey within a GUI of a software application in some example embodiments. In an embodiment, the gaze detection function system may generate a third type of gaze detection feedback signal to the wireless headset device 430 to generate a corresponding type of audio feedback, haptic feedback or combination feedback via the audio and haptic feedback controller. Confirmation of gaze determination of the display device location being gazed at corresponding to a localized portion 444 in grid 443 as well as confirmation of any actions detected by the gaze detection function system via images captured via camera 412 may generate one or more types of gaze detection feedback signals in embodiments herein. Those various types of gaze detection feedback signals are used to generate corresponding audio feedback via speakers 431, corresponding haptic feedback 421 via haptic actuators of the wireless headset device or some combination according to various embodiments described herein.

Figure 5A:
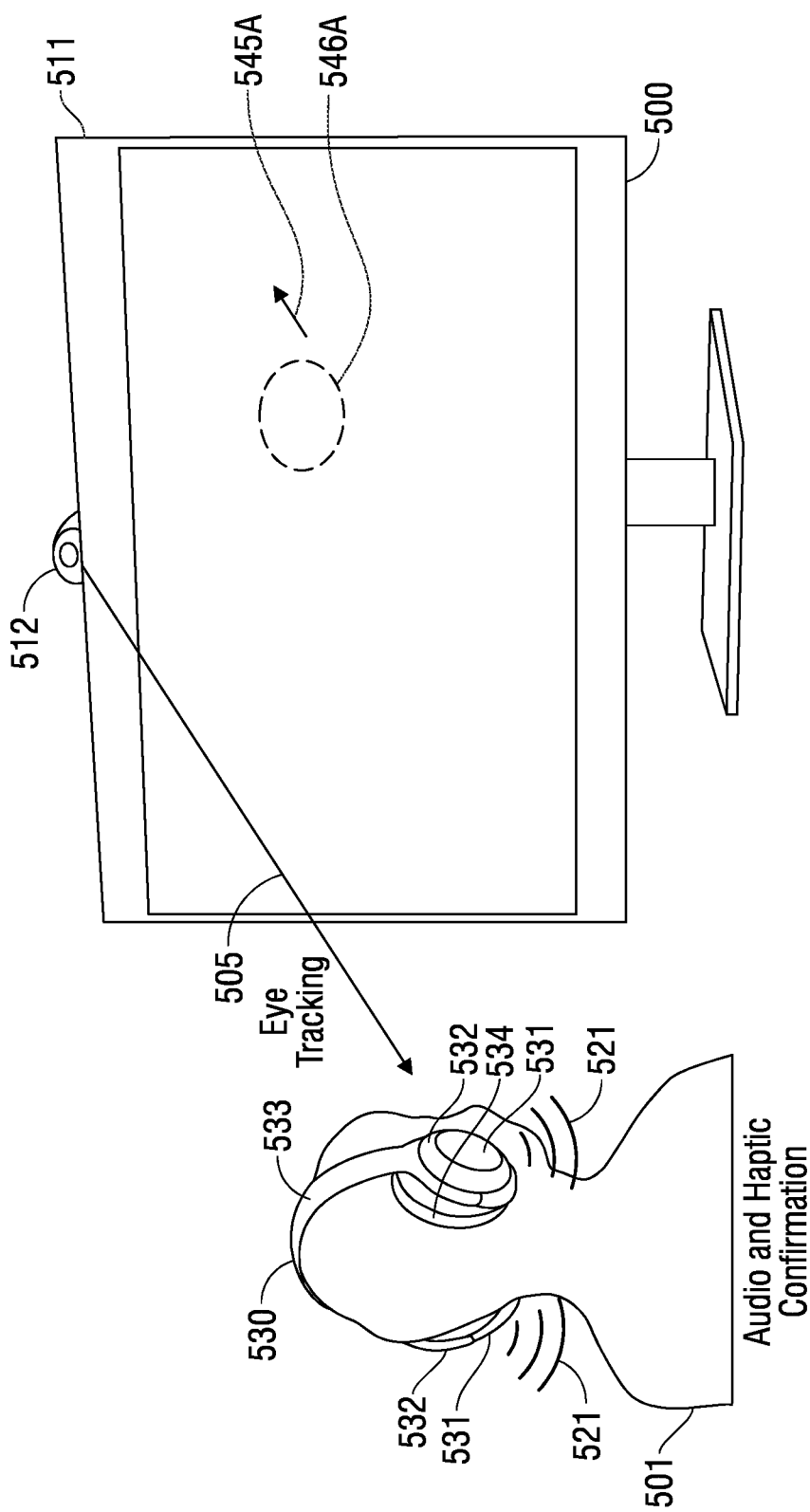
FIG. 5A is a graphical diagram illustrating a wireless headset device wirelessly coupled to a host information handling system and used to provide audio or haptic feedback with a gaze detection function system for cursor control according to an embodiment of the present disclosure.
Figure 5B:
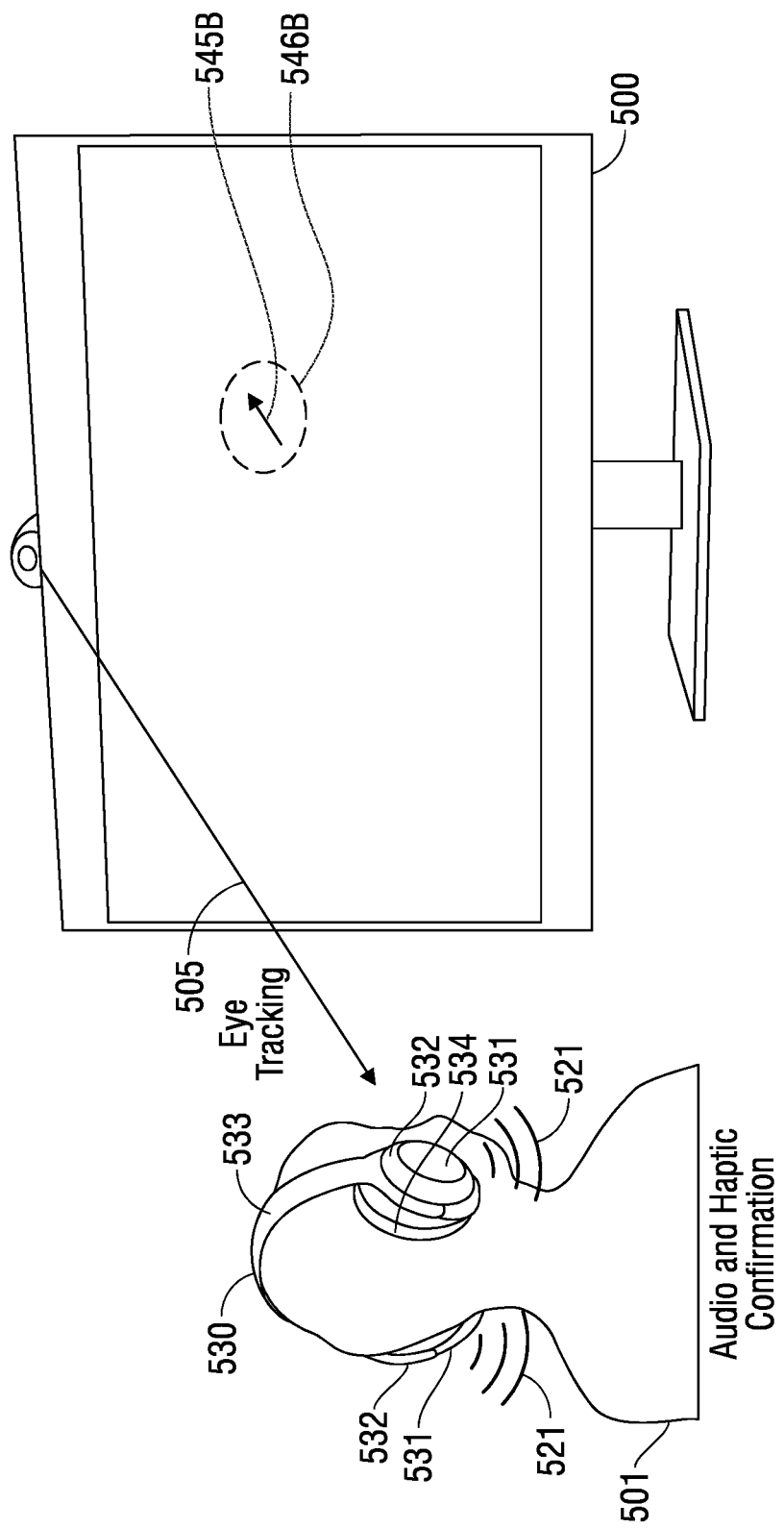
FIG. 5B is a graphical diagram illustrating a wireless headset device wirelessly coupled to a host information handling system and used to provide audio or haptic feedback with a gaze detection function system for cursor control according to another embodiment of the present disclosure.

FIG. 5A and FIG. 5B are graphical diagrams illustrating a wireless headset device coupled to a host information handling system and provided audio feedback or haptic feedback via a gaze detection function system for a cursor control system according to an embodiment of the present disclosure. FIG. 5A and FIG. 5B show a user 501 wearing a wireless headset device 530 and interacting with a gaze detection function system executing on host information handling system 500. The wireless headset device 530 may be a headphone set as shown and include one or more speakers 531 located in earcups 532 of the headphones 530. The speakers 531 may be used to play an active audio data stream received wirelessly as well as provide audio feedback pursuant to gaze detection feedback signals received from a gaze detection function system operating at the host information handling system 500. The earcups 532 may be connected with a headband 533 that fits over a user's head. Further, one or more haptic actuators may be located in the headset 530. The haptic actuators may provide haptic feedback 521 according to embodiments herein. The haptic actuator or actuators may be located in the housing of the headset at the earcups 532, in the headband 533, or in earcup cushions 534 that rest against the user's head and encompass the user's ears in various embodiments as described herein. The haptic actuators may be used to generate haptic feedback 521 pursuant to gaze detection feedback signals received from a gaze detection function system operating at the host information handling system 500 according to various embodiments described herein. The wireless headset device may also be a set of earbuds in another example embodiment as described in embodiments above (not shown). The earbuds may each contain a speaker and may each have a haptic actuator located within a housing of the earbud in an example embodiment.

Host information handling system 500 has a display device 511 in which one or more software applications, hardware, or data files may present content to a user with content items such as GUIs, windows, icons, or others as described in embodiments herein. As described in embodiments herein, a gaze detection function system operates at the host information handling system 500 to interact with content, such as GUIs, windows, icons or the like, on the display device 511. The gaze detection function system operates to determine, by gaze tracking or eye tracking 505, a display device location that corresponds to a portion of the display device 511 being looked at in an example embodiment. Camera 512 captures one or more images of a user 501, and particularly a portion of the image to include the eyes, pupils, or a Purkinje image of the eyes of user 501 in embodiments herein to conduct eye or gaze tracking by the gaze detection function system.

In the shown embodiment of FIG. 5A, a user 501 wearing the wireless headset device 530 may determine to select a location for a cursor by gazing at a gaze location 546A on the video display device 511 that may be where some desired content or a GUI softkey or other interface may be located. The user's gaze location 546A of the content displayed on the display device 511 is shown by the dotted circle. In a particular embodiment, the gaze detection function system at the information handling system 500 conducts eye or gaze tracking 505 of a user's gaze toward the display device 511. In an embodiment, the eye or gaze tracking utilized one or more images captured by a camera 512 with view of the user's eyes and may utilize one or more eye images, pupil images, or Purkinje images. With these images, the gaze detection function system determines a vector calculation of a gaze vector based on the known location and angle of the display device 511, the location of the camera 512 relative to the display device 511, the detected distance or angle of the user 501 from the camera 512 and display device 511, and may calculate an angle of gaze direction based on the images of the user's eyes, pupils, or Purkinje images according to various embodiments. With some or all of the above information, the gaze detection function system may extrapolate a gaze vector from the user's eye to extend to a location on the display device 511. This results in a display device location being determined at a set of candidate gaze coordinates on the display device 511. With this information, the gaze detection function system may send a command to a display driver to generate or move a cursor 545A and locate the cursor image at the determined candidate gaze coordinates.

The gaze detection function system may generate a first gaze detection feedback signal and send it to wireless headset device 530 for a first audio, a first haptic feedback, or a first combination feedback to be generated by the audio and haptic feedback control system with either the speaker or haptic actuator thereon as confirmation gaze detection identification feedback that a cursor 545A has been located at determined candidate gaze coordinates. This audio feedback or haptic feedback may be provided concurrently with the movement of cursor 545A to the candidate gaze coordinates on the display device 511. Further, the cursor 545A may correspond with a content element being displayed on the display device 511. For example, the cursor 545A at the determined candidate gaze coordinates may correspond with one or more icons or may fall on a window, GUI element or other content element in some embodiments.

In an embodiment, the user may perform an action to reject the candidate gaze coordinates of cursor 545A since they do not align with the gaze location 546A on the display device 511. For example, FIG. 5A shows a situation where the cursor 545A at candidate gaze coordinates on the display device 511 is not aligned with the gaze location 546A on the display device 511. Again, the action may be any gesture or action as described in embodiments herein including one or more blinks, head nods, head shakes, head tilt or gestures with a hand, finger or device such as a stylus. However, the action to reject the candidate gaze coordinates may be a different action, such as a different number of blinks or a different type of head gesture or hand/finger gesture for example, than the action to accept. If the gaze detection function system determines from captured images of the action via camera 512 that the action detected corresponds to rejection of the cursor 545A location, then the cursor 545A at the candidate gaze coordinates does not match the gaze location 546A as is depicted in FIG. 5A. With the action to reject the candidate gaze coordinates of cursor 545A, the gaze detection function system may generate and transmit a second type of gaze detection feedback signal and send it to wireless headset device 530 for a second audio, second haptic feedback, or a second combination feedback to be generated by the audio and haptic feedback control system with the speaker or haptic actuator thereon as confirmation of the rejection of the candidate gaze location coordinates in some embodiments.

Upon detecting an action by the user 501 that is determined by the gaze detection function system as a rejection of the candidate gaze coordinates for cursor 545A, the gaze detection function system may initiate a re-assessment or recalibration to the eye tracking or gaze tracking algorithm by detecting eye position, pupil position or utilize Purkinje images to redetermine a vector of gaze of a user 501 relative to the camera 512 and display device 511 to calculate new candidate gaze coordinates on a display device location and locate the cursor 545A at the new gaze coordinates. At this point, the first or a new gaze detection feedback signal and send it to wireless headset device 530 for the first or new audio, the first or new haptic feedback, or the first or a new combination feedback to be generated by the audio and haptic feedback control system with either the speaker or haptic actuator thereon as confirmation gaze detection identification feedback that cursor 545A has been located at new determined candidate gaze coordinates. This audio feedback or haptic feedback may be provided concurrently with the movement of cursor 545A to the new candidate gaze coordinates on the display device 511. The acceptance or rejection of the new candidate gaze coordinates may then cause the gaze detection function system to reset to yet another new set of candidate gaze coordinates according to embodiments herein or proceed to utilize the new cursor location if accepted by a user's action.

In an embodiment shown in FIG. 5B, the display device location of cursor 545B aligns with the user's gaze location 546B. In such an embodiment, the user may perform an action to accept the candidate gaze coordinates of cursor 545B. This may be referred to as a user acceptance action. The user acceptance action may be any gesture or action as described in embodiments herein including one or more blinks, head nods, head shakes, head tilt or gesture with a hand, finger or device such as a stylus. If the gaze detection function system determines from captured images of the action via camera 512 that the action corresponds to acceptance of the cursor 545B location at the candidate gaze coordinates, then the cursor 545B at the candidate gaze coordinates matches the gaze location 546B as is depicted in FIG. 5B and the user may utilize the cursor 545B. The detected user acceptance action accepting the candidate gaze coordinates of cursor 545B if matched to the gaze location 546B may be also utilized or may double as a content interfacing action with content presented at the cursor 545B location on display device 511 in some embodiments. User content interface actions may include interface activity similar to that which may occur via a keyboard, mouse, touchpad, or touchscreen such as a click to select a content item or an interface action to actuate a softkey or other functional portion of a GUI presented there in some example embodiments. Any content interface action with content presented by the information handling system 500 at the display device 511 and pointed to by cursor 545B may be utilized with the gaze detection function system acting as a cursor control system according to various embodiments. For example, any content interface action via a cursor with content displayed that could be performed with a touchpad, touchscreen, or mouse may be performed with the gaze detection function system acting as a cursor control system as well as detecting and classifying a content interface action in images of user 501 in the embodiments of the present disclosure. In another embodiment, a second action may be performed by the user that is a distinct content interface action that is different from the user acceptance action of the candidate gaze coordinates, instead of the first user acceptance action being the same as the user content interface action. The second, separate content interface action may be the same action as a user acceptance action, but repeated a second time, or may be a different action to be detected as the content interfacing action to interface with the content presented at the display device location at cursor 545B in various embodiments.

With the acceptance action to accept the candidate gaze coordinates of cursor 545B, the gaze detection function system may generate and transmit a third type of gaze detection feedback signal and send it to wireless headset device 530 for a third audio feedback, third haptic feedback, or a third combination feedback to be generated by the audio and haptic feedback control system with the speaker or haptic actuator thereon. This third audio feedback, third haptic feedback, or a third combination feedback may act as confirmation of the acceptance and confirmation of a concurrent content interfacing action in some embodiments. It is appreciated that a forth type of feedback may be used if confirming a separate detected user interfacing action by the user to interface with content at the cursor 545B as with some embodiments described herein. Operation of the gaze detection function system for cursor control and other functions of embodiments herein and the gaze detection function system to generate successive gaze detection feedback signals sent to a wireless headset device 530 to produce corresponding audio feedback, haptic feedback, or combination feedback is described further with respect to FIGS. 6 and 7 below.

Figure 6:
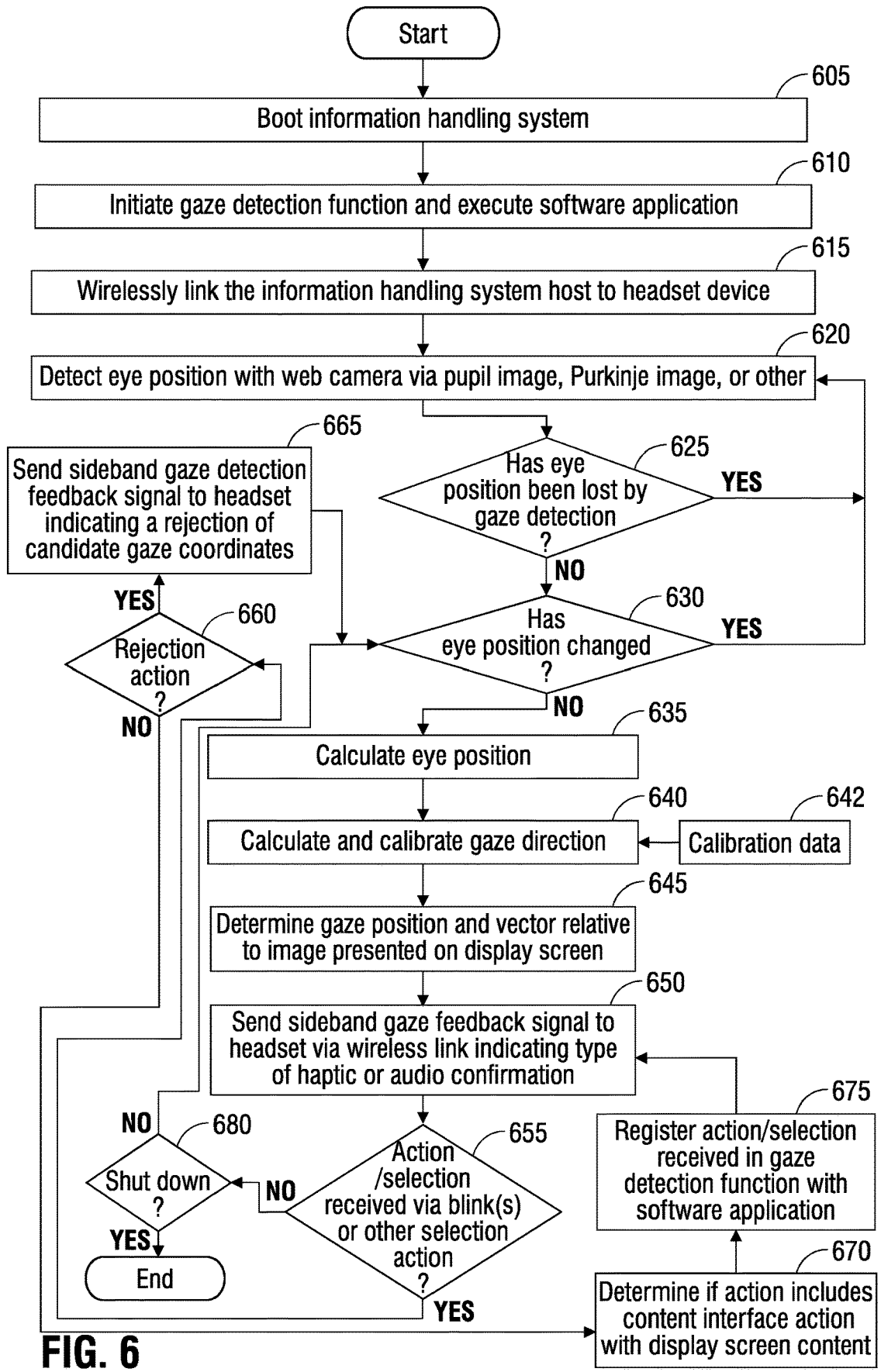
FIG. 6 is a flow diagram illustrating a method of operating a gaze detection function system with audio or haptic feedback to a user via wireless headset device according to an embodiment of the present disclosure.

FIG. 6 is a flow diagram illustrating a method of operating a gaze detection function system for a user with audio feedback or haptic feedback to the user via wireless headset device according to an embodiment of the present disclosure. According to embodiments herein, the gaze detection function system may utilize a worn peripheral wireless headset device for audio feedback, haptic feedback, or combination feedback from gaze detection and actions interacting with content on a display device via the gaze detection function system operating on a host information handling system. The gaze detection function system may operate with a camera, such as a web camera, to capture images of the user and, in particular, images of the user's eyes including pupil images or Purkinje images and conduct gaze or eye tracking according to embodiments herein. A user wearing a wireless headset device may utilize gaze tracking of the gaze detection function system as an input/output system for interacting with a display device of the host information handling system and content displayed thereon by software, hardware, or data files according to embodiments herein.

At block 605, the host information handing system may boot up in an embodiment. A user may turn on the information handling system to cause BIOS and OS systems to boot. At block 610, the user may initiate one or more software applications that may include interfacing with hardware and data files. Such software applications may present content on an information handling system display device. Such content may include GUIs with one or more virtual interfaces such as softkeys, sliders, selection buttons or the like. Further content presented on the display device may include windows with drop down menus, short cuts, and application content within the window including presented content from applications such as word processors, CAD systems, presentation systems, browsers, or the like. Additional content may be presented via the display device such as icons, control bars, information hubs, or other content items displayed at various locations on a display device.

In another embodiment, the user may initiate, or auto-initiation may occur with boot up of the gaze detection function system and utilization of the camera as an interface between a user and content presented on a display screen via gaze detection and tracking (e.g., eye tracking) of the user as she sits before a display device in some embodiments.

At block 615, the wireless network interface device of the host information handling system may establish a wireless link between a wireless headset device and the host information handling system in an embodiment of the present disclosure. First, a user may turn on a wireless headset device or may don the wireless headset device and power it up. Upon doing so, the wireless headset device may be available for or may seek to wirelessly couple to the host information handling system in some embodiments. In other embodiments, the gaze detection function system may initiate a wireless coupling from the network interface device at the host information handling system to one or more available wireless headset devices detected within wireless range of the host information handling system. In some embodiments, upon powering up the host information handling system and the wireless headset device, they may pair via a pre-pairing procedure such as via Bluetooth® or BLE. Other wireless protocols, such as Wi-Fi, NFC, 5G small cell system, or others, may be used to establish a wireless link as well according to various embodiments and are recited herein with respect to FIG. 1.

Proceeding to block 620, the gaze detection function system may assess one or more images captured of the user, and in particular of the user's eyes, via a camera to conduct gaze tracking in an embodiment. In various embodiments, the gaze detection function system operates to determine, by gaze tracking or eye tracking, a display device location at candidate gaze location coordinates that correspond to a portion of the display device being looked at in an example embodiment. The eye tracking process begins with camera, such as a web camera, capturing one or more images of a user, and particularly a portion of the image to include the eyes, pupils, or a Purkinje image of the eyes of user in embodiments. The gaze detection function system uses these images to determine eye position as well as location of a user, including distance and angle of the eyes from an eye position determination relative to the camera as well as the position of the display screen in an embodiment. The relative angle and position of the camera relative to the display screen is also input and determined for the assessment of eye position and later determination of a gaze direction.

Proceeding to block 625, one or more subsequent images of the user and the user's eyes may be captured by the camera. The gaze detection function system determines whether the image of the user's eyes or eye position has been lost at block 625. If so, the method returns to block 620 to recapture one or more images with the camera to include eye images such as a pupil image, Purkinje image, or other. If so, the eye position of the user's eyes are again detected, in the pupil image, Purkinje image, or other at block 620, for the later gaze direction and distance vector calculations in some embodiments. The method then proceeds again to block 625.

If at block 625, the gaze detection function system has not lost an image of the user's eyes in subsequently captured images by the camera, flow may proceed to block 630. At block 630, the gaze detection function system may review subsequently captured images of the user, and in particular the user's eyes (pupils, Purkinje images, et cetera) and determine if the eye position has changed for the user. If the eye position has changed, then the detected eye position determined by the gaze detection function system at block 620 may no longer be valid and flow may return to block 620 to re-detect eye position with web camera images as described in the embodiments above and the method may proceed as before. If, however, the user's eye position is maintained and has not changed in one or more subsequently captured images by the camera, the gaze detection function system may proceed to block 635 to calculate the eye position including eye angle.

At block 635, the gaze detection function system calculates eye position. In one example embodiment, calculation of eye position may be done by utilizing images of the pupils and determining how the pupil center reflection and corneal reflection portion of the image of the user's eye and pupil appears relative to the image taken of the user's eyes from the angle at which the camera is viewing the user. The image may be acquired within a headbox or range of the camera. Image processing and image recognition may be used to determine what portion of the image are the user's eyes and pupils in example embodiments. This image processing may further detect the eyes and pupils while rejecting any artifacts. For example, a top mounted web camera may determine that the circular pupil reflection may appear round and in some first alignment with a corneal reflection when looking straight at the camera in an aspect. Any downward or side gaze may alter the viewable portion of the pupil or the shape of the viewable pupil reflection relative the corneal reflection and alignment of those reflections to the camera in an embodiment. This data may be used to input into a model to calculate the eyes gaze vector direction and extrapolate to a gaze point on the display screen at candidate gaze location coordinates or a zone or area of pixels around a set of candidate gaze location coordinates in various embodiments as described herein. In further embodiments, the camera or other sensor detects the distances determined for any side, top or bottom of the pupil relative to the eb camera in some embodiments. This determination of the pupil appearance or distances of portions of the pupil perimeter, or image angles and size of sides or the center of the pupils as they appear in captured images are used to determine eye position of the user's eyes in an embodiment. Further, near infrared sensors as well as optical sensors may be used to assist with detection of the user as well as distance determinations of the user from the camera or the display device. In another embodiment, Purkinje images of a user's eyes detect reflection of light on the user's eyes of structures within the eyes including reflections of an outer surface of the cornea, an inner surface of the cornea, an outer lens surface, and an inner lens surface. Movement of these Purkinje images of structures relative to one another and a fixed light source, for example, may be used to determine eye position of a user's eye since the vectors of reflection off of these surfaces changes with eye position in an example embodiment. These techniques and others understood by those of skill may be used to determine an angle of eye position relative to the camera or the display device in various embodiments.

Proceeding to 640, the gaze detection function system calculates and determines gaze direction of the user's eyes based on the determined eye position and other factors retrieved from calibration data 642 in an embodiment. With the captured images and determination of eye position, the gaze detection function system determines a vector calculation of a gaze vector toward the display device based on the known location and angle of the display device, the location of the camera relative to the display device, and the detected distance or angle of the user from either the camera, the display device or both, and the determined eye position of the user's eyes. Some or all of the above measurements are determined via the images captured by the camera, or any distance measurements conducted by other sensors, such as infrared sensors, light sensors, or other distance sensors, of the user sitting before the display device. Location of the camera relative to the display device and angles of the same relative to one another, as well as distance measurements of a user's head or eyes from the camera or display device may be measured and then stored in calibration data 642. This calibration data 642 may then be retrieved and used with the eye position determination by the gaze detection function system to assess the gaze direction. In an example embodiment, the gaze detection function system may calculate an angle of gaze direction based on the eye position determined from the images of the user's eyes, pupils, or Purkinje images as well as the measured position of the user relative to the display screen and camera according to various embodiments. With some or all of the above information, including calibration data 642, the gaze detection function system may extrapolate a gaze vector from the user's eye, and its determined position as well as the distance or position of the user's eyes relative to the camera or display screen, to extend an extrapolated gaze vector to a location on the display device in an embodiment as discussed at block 645.

At block 645, the gaze detection function system determines gaze direction relative to a display device location for screen presented data or content in an embodiment. In an example embodiment, the gaze detection function system determines an extrapolated vector of gaze for the gaze or eye tracking from gaze direction, and associates it with a display device location to determine a set of candidate gaze coordinates on the display device. The gaze detection function system may calculate an angle of the gaze direction based on the eye position determined from the images of the user's eyes, pupils, or Purkinje images as well as the measured position of the user relative to the display screen and camera according to various embodiments. With some or all of the above information, the gaze detection function system may extrapolate the gaze vector from the user's eye to extend to a location on the display device to identify a set of candidate gaze coordinates at that display device location or an area of pixels near the set of candidate gaze coordinates on the display device. Any size area of pixels or any shape area may be used and anchored by a set of gaze coordinates approximating the gaze location on the display device in various embodiments of the present disclosure. Then the gaze detection function system may send a command to a display driver to generate or move a cursor, generate another gaze location indicator on the display device, select and highlight a localized portion of a display device partitioned into a grid, or determine a portion of the display device as delineated into halves, quadrants, or some other delineation according to various embodiments herein.

At block 650, the gaze detection function system may generate a first gaze detection feedback signal and send it to wireless headset device for a first audio or first haptic feedback to be generated by the audio and haptic feedback control system at the wireless headset device. The audio feedback, haptic feedback, or combination feedback may be provided to the user with either the speaker, haptic actuator, or both thereon as confirmation gaze detection identification feedback indicating that a gaze location has been identified at a display device location, such as at an area around or on a set of candidate gaze location coordinates, in an embodiment. The gaze detection feedback signal may be transmitted from the host information handling system via the wireless link to the wireless headset device in an embodiment. In one particular embodiment, the gaze detection feedback signal generated by the gaze detection function system may be transmitted to the wireless headset device on a sideband channel for command signal in the wireless link. In other embodiments, another sideband signaling channel may be used in the same wireless line or one parallel to the wireless link described above. The gaze detection function system may generate the first gaze detection feedback signal and send it to wireless headset device as described for the first audio, the first haptic feedback, or the first combination feedback to be generated by the audio and haptic feedback control system. This audio feedback, haptic feedback or combination feedback may also be provided concurrently with the movement of cursor, generation of another gaze location indicator on the display device, highlighting a localized portion of a display device partitioned into a grid, or a determination of a portion of the display device being selected as between delineated halves, quadrants, or some other delineation base on the candidate gaze coordinates on the display device. Further, the cursor, other gaze location indicator, localized portion highlighted, or delineated half, quadrant or other portion on the display screen may correspond with a content element being displayed on the display device. For example, the cursor or other gaze location indicator displayed on the display screen, localized portion of the grid defined across the display screen, or a delineated section of the display screen at the determined candidate gaze coordinates or an area defined around those candidate gaze coordinates may correspond with one or more icons, may fall on a window, or may correspond with a GUI element or other content element in some embodiments.

Proceeding to block 655, the user may perform an action which may be any gesture or action as described in embodiments herein including one or more blinks, head nods, head shakes, head tilt or gestures with a hand, finger or device such as a stylus in an embodiment. Such an action may be determined from a subsequent image or images captured by the camera to be recognized, via image recognition, as one of the above gestures or other gestures to indicate a particular action. A user may make an acceptance or rejection action to reject or accept the candidate gaze coordinates of cursor or other gaze location indicator displayed on the display screen, localized portion of the grid defined across the display screen, or a delineated section of the display screen in one example embodiment. In another embodiment, the user may make a content interfacing action via one or more gestures as described to interact with a content item displayed at a display device location corresponding to determined candidate gaze coordinates. Such an interfacing action may include selecting or clicking on a displayed content item, grabbing a displayed content item, toggling a soft key displayed, actuating a GUI interface, or any other of a number of displayed content interface actions that may be conducted, for example with a keyboard, mouse, touchpad, or touchscreen in various example embodiments.

If an action is received at block 655, flow may proceed to block 660 with determining whether the user action corresponds with a rejection action in an embodiment. For example, a user may cause a rejection action, one type of gesture among the gestures described, to indicate that the candidate gaze coordinates on the display device are not correct. This may occur when the determined candidate gaze coordinates do not align with the gaze location the user is looking at on the display device. For example, FIG. 5A shows a situation where the cursor 545A at candidate gaze coordinates on the display device 511 are not aligned with the gaze location 546A on the display device 511 in an embodiment and thus a rejection action may be performed by one or more gestures. This compares to another example at FIG. 5B, where the cursor 545B at candidate gaze coordinates on the display device 511 are aligned with the gaze location 546B on the display device 511 in an embodiment and thus an acceptance action may be performed by one or more gestures from a user. Again, the action may be any gesture or action as described in embodiments herein including one or more blinks, head nods, head shakes, head tilt or gestures with a hand, finger or device such as a stylus. However, the action to reject the candidate gaze coordinates may be a different action, such as a different number of blinks or a different type of head gesture or hand/finger gesture for example, than the action to accept.

The method may proceed to block 665 if the action is a rejection action. If the gaze detection function system determines from captured images of the user's action via the camera that the action detected corresponds to rejection of the location of the cursor, other gaze location indicator, localized portion highlighted, or delineated half, quadrant or other portion on the display screen at block 660, then the candidate gaze coordinates do not match the user's actual gaze location. With the action to reject the candidate gaze coordinates determined at block 660, the gaze detection function system may generate and transmit a second type of gaze detection feedback signal at block 665 and send it to wireless headset device for a second audio, second haptic feedback, or a second combination feedback to be generated by the audio and haptic feedback control system with the speaker or haptic actuator thereon as confirmation of the rejection of the candidate gaze location coordinates in some embodiments.

Upon detecting an action by the user that is determined by the gaze detection function system as a rejection of the candidate gaze coordinates, method may return to block 630 where the gaze detection function system may initiate a re-assessment or recalibration to the eye tracking or gaze tracking algorithm by detecting eye position, pupil position or utilize Purkinje images to redetermine a vector of gaze of a user relative to the camera and display device to calculate new candidate gaze coordinates at a new display device location and then proceed with the method steps as described above.

If at block 660, the detected user action is not a rejection action of the candidate gaze coordinates, the action is determined as to whether it includes a content interfacing action at block 670 in an embodiment. Whether an action, such as an acceptance action, doubles as content interface action or requires a separate content interface action may be a policy set for the gaze detection function system. A user's action as detected and interpreted by the gaze detection function system may be simply an acceptance action of the candidate gaze coordinates in one embodiment. In another embodiment, the user action received at block 655 may be a combined acceptance action accepting the candidate gaze coordinates as well as a content interfacing action to perform some action on the content displayed at the gaze coordinates for the location of the cursor or other gaze location indicator displayed on the display screen, localized portion of the grid defined across the display screen, or a delineated section of the display screen at the determined candidate gaze coordinates or an area defined around those gaze coordinates in an embodiment. In some embodiments the gaze detection function system may detect and interpret actions that are separate content interfacing actions from acceptance actions and those content interfacing actions may correspond with interactions with one or more icons, a window or elements thereof, or may correspond with a GUI element or other content element in some embodiments according to various embodiments herein.

Proceeding to block 675, the gaze detection function system may register the action as an acceptance action when applicable. In another embodiment, the action may include a content interface action and may register the selection of the content interfacing action with operating software applications that present the displayed content on the display device in an embodiment. In the latter case, the operating software application will register and operate in accordance with its instructions input with the content interface action at the gaze location coordinates to respond or execute further actions in the software, on hardware, or on data files in accordance with that operating software. The received input from the gaze detection function system's detection of the content interfacing action operates as an I/O device for a user to input into operating software applications in embodiments herein.

Flow returns to block 650 then to generate an additional gaze detection feedback signal and send it to wireless headset device for an additional audio feedback, additional haptic feedback or additional combination feedback to be generated by the audio and haptic feedback control system at the wireless headset device in an embodiment. In some example embodiments a third type of audio feedback, haptic feedback, or combination feedback may be generated by sending a third type of gaze detection feedback signal from the gaze detection function system that pertains to only an acceptance action detected and interpreted from the received user action. In another example embodiment, a fourth or other different type of audio feedback, haptic feedback, or combination feedback may be generated from a fourth gaze detection feedback signal that may relate to a content interfacing action detected and interpreted by the gaze detection function system on the host information handling system. It is contemplated that many various types of audio feedback, haptic feedback, or combination feedback may be indicated in the gaze detection feedback signal sent by the gaze detection function system of the host information handling system at block 650. This gaze detection feedback signal may then be interpreted by the audio and feedback control system on the wireless headset device to determine a type of audio, haptic, or combination feedback. Based on the type of gaze detection feedback signal received, a corresponding type of audio feedback, haptic feedback, or combination feedback may be provided to the user with either the speaker, haptic actuator, or both thereon as confirmation of gaze coordinates or as confirmation of any number of content interfacing actions performed by a user to interact with content displayed on the display device in embodiments herein. It further is contemplated that content interface actions may be available for a user to interact with displayed content similarly to how a user may interact with displayed content via other I/O devices such as a keyboard, mouse, touchpad, touchscreen, or the like. The feedback provided to the user via a wireless headset device according to embodiments herein assists a user of the gaze detection function system as an I/O device for inputs to displayed content. Further, the gaze detection function system may provide audio, haptic, or combination feedback for a user to navigate with gaze tracking cursor control movements or navigate the display screen via other gaze location indicators displayed on the display screen, among localized portions of a grid defined across the display screen, or among delineated sections of the display screen at the determined candidate gaze coordinates or an area defined around those gaze coordinates in various embodiments herein. The gaze detection feedback signal, including indication of the type of audio, haptic, or combination feedback to be administered, may be transmitted from the host information handling system via the wireless link to the wireless headset device in an embodiment. In one particular embodiment, the gaze detection feedback signal generated by the gaze detection function system may be transmitted to the wireless headset device on a sideband channel for command signal in the wireless link. In other embodiments, another sideband signaling channel may be used in parallel to the wireless link described above. Upon providing audio, haptic, or combination feedback to a user during cursor or other display screen navigation or with respect to content interfacing actions, the method may monitor for additional actions at block 655. At block 655, if actions or no further actions are received, the flow may proceed to block 680.

In an example embodiment, the gaze detection function system on the host information handling system may monitor subsequent images of the user's eyes to see if additional actions are being received but also to see if the user's eye position has changed or changes for a consistent time period. This time period may be any threshold time period of a changed at which point, the gaze detection function system may proceed to block 680 to determine if the host information handling system is being shut down and if so that the method may end.

If the host information handling system is not being shut down at block 680, the gaze detection function system may proceed back to block 630 with the monitoring of a time period expiring where the user's eye position has changed from the eye position for the gaze coordinates determined. This time period may be less than one second in an embodiment. In other embodiments the time period may be greater than one second and may be plural seconds. The time period may be set depending on a desired sensitivity to changed eye positions of the gaze detection function system in an embodiment. With the gaze detection function system continuing to monitor the eye position changes, if the eye position changes exceed the threshold time period, the gaze detection function system may then proceed to detect a new eye position at 620 and proceed before with determining new candidate gaze location coordinates if eye position has changed. The method may then proceed as described.

Figure 7:
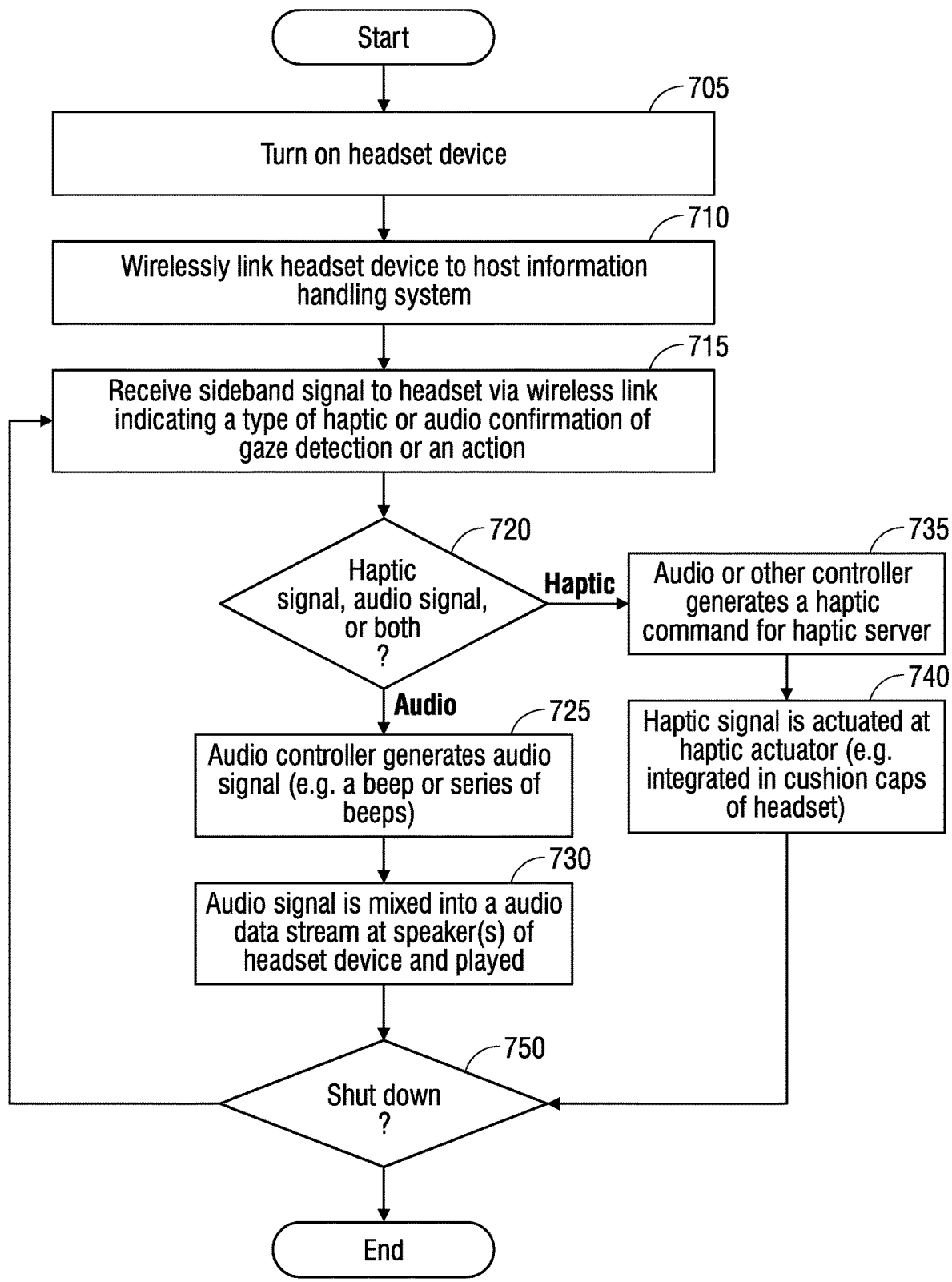
FIG. 7 is a flow diagram illustrating a method of operating an audio and haptic feedback control system on a wireless headset device to provide confirmation feedback for a gaze detection function system operating on an information handling system according to an embodiment of the present disclosure.

FIG. 7 is a flow diagram illustrating a method of operating an audio and haptic feedback control system at a wireless headset device with a gaze detection function system at a host information handling system for audio feedback, haptic feedback, or combination to the user via wireless headset device according to an embodiment of the present disclosure. According to embodiments herein, a user may put on a peripheral wireless headset device for audio and microphone function, but also for audio feedback, haptic feedback, or combination feedback from gaze detection and actions interacting with content on a display device via the gaze detection function system operating on a host information handling system. The gaze detection function system may operate in accordance with embodiments herein. A user wearing a wireless headset device may utilize gaze tracking of the gaze detection function system as an input/output system for interacting with a display device of the host information handling system and content displayed thereon by software, hardware, or data files and receive audio feedback, haptic feedback, or combination feedback to assist with those interactions according to embodiments herein. Further, the user of the wireless headset device may utilize audio feedback, haptic feedback, or combination feedback to navigate gaze locations on the display device for cursor control or control of other gaze location indicators, selection among localized portions, such as blocks, on a grid of the displayed content, or navigation among delineated portions of the content displayed on the display screen in various embodiments.

At block 705, the wireless headset device may be turned on and may boot up in an embodiment. A user may turn on the wireless headset device and boot a microcontroller integrated circuit and a wireless headset device radio system thereon as well as other systems of the wireless headset device. This boot up may also initiate the audio and haptic control system executing on the microcontroller unit or other processing resource at the wireless headset device in embodiments herein.

At block 710, the wireless headset device radio system and headset wireless chipset may establish a wireless link with the host information handling system in an embodiment. Upon doing so, the wireless headset device may be available for or may seek to wirelessly couple to the host information handling system in some embodiments. In other embodiments, the gaze detection function system at the host information handling system or the wireless headset device may initiate a wireless coupling. In some embodiments, upon powering up, the wireless headset device and host information handling system may pair via or be pre-paired via a wireless protocol such as via Bluetooth® or BLE. Other wireless protocols, such as Wi-Fi, NFC, 5G small cell system, or others, may be used to establish a wireless link as well according to various embodiments and are recited herein with respect to FIG. 1.

At block 715, the wireless headset radio system may receive a gaze detection feedback signal via the wireless link in an embodiment. The gaze detection feedback signal may be received from the gaze detection function system on the host information handling system and may include metadata or other data indicating a type of audio, haptic, or combination feedback to be provided to the user via a speaker or haptic actuation located on the wireless headset device. As described in embodiments herein, the type of gaze detection feedback signal provided may be labelled by the gaze detection function system based on whether the gaze detection function system is sending confirmation that candidate gaze coordinates have been determined, or sending confirmation of a detected user action such as a rejection action by the user, an acceptance action from the user, or a content interfacing action from the user of which there may be several types in embodiments herein. It is contemplated that any of a plurality of types of audio feedback, haptic feedback, or combination feedback may be used to correspond to the gaze detection function system confirmations send with gaze detection feedback signals received from the host information handling system.

At block 720, in an embodiment, the audio and haptic feedback control system executing at the microcontroller or other processing resource at the wireless headset device may receive the gaze detection feedback signal including metadata or other data indicator of the type of feedback being sent in embodiments herein. The audio and haptic feedback controller may then determine the type of audio feedback, haptic feedback, or combination feedback received with the gaze detection feedback signal received. This may be done by referencing a table or data stored in memory on the wireless headset device for the type of audio feedback, haptic feedback, or combination feedback identified in the metadata or other indicator according to various embodiments described herein.

If the type of feedback is audio feedback or combination feedback that includes an audio component as determined by the audio and haptic feedback control system at block 720, then flow may proceed to block 725. If the type of feedback is haptic feedback or combination feedback that includes a haptic component as determined by the audio and haptic feedback control system at block 720, then flow may proceed to block 735.

At block 725, audio and haptic feedback control system may retrieve from memory or generate with an audio controller an audio signal to be played at the speaker of the wireless headset device in response to the determined type of audio feedback or audio portion of combination feedback indicated with the gaze detection feedback signal. As described above, the audio feedback signal may be a beep, series of beeps, a tone or series of tones, or any pre-recorded feedback sound or message. This audio feedback signal for audio playback may then be sent to a multiplexer at block 730 to be connected to the speaker on the wireless headset device. The multiplexer may insert the audio feedback signal that comprises the audio feedback or a portion of combination feedback into an existing active audio data stream being received from a wireless link in an embodiment. In other embodiments, where no active audio data stream is playing at the speaker, the audio feedback signal generated or retrieved from memory for the audio feedback or audio portion of combination feedback pursuant to the gaze detection feedback signal may be mixed onto the feed line for the speaker of the wireless headset system and played thereon.

Flow may proceed to block 750 to determine if the wireless headset device is shut down or removed from the user's head in various embodiments. If shut down or removed at block 750, the method may end. If not, then flow may return to block 715 with the audio and haptic feedback control system monitoring for additional gaze detection feedback signal received wirelessly from the gaze detection function system at the host information handling system. The method may proceed as before when gaze detection feedback is received.

At block 735, audio and haptic feedback control system may retrieve from memory or generate with an audio controller, haptic controller or another controller or processing resource, a haptic command corresponding to the type of haptic feedback identified in the gaze detection feedback signal in an embodiment. The haptic command is sent to the haptic actuator device or a driver circuit for the haptic actuator device in an embodiment to generate the type of haptic feedback identified. With this, the haptic actuator device may generate haptic feedback in response to the determined type of haptic feedback or haptic portion of combination feedback indicated with the gaze detection feedback signal in an embodiment at block 740. The haptic feedback may be any type of haptic feedback and may include a buzz, click, or series of buzzes or clicks in various example embodiments. In an example embodiment, the haptic actuator may be integrated into cushion caps of a headphone type of wireless headset device to interface with the user's head and provide the haptic feedback or portion of combination feedback to the user from the gaze detection function system. In other example embodiments, the haptic actuator may be located in the housing of the wireless headset device, either headphones or earbuds, at various portions of those housings such that the haptic feedback may resonate the housing and be felt by the user.

Flow may then proceed to block 750 to determine if the wireless headset device is shut down or removed from the user's head in various embodiments. If shut down or removed at block 750 as before, the method may end. If not, then flow may return to block 715 with the audio and haptic feedback control system monitoring for additional gaze detection feedback signal received wirelessly from the gaze detection function system at the host information handling system. Then the method may proceed as before when gaze detection feedback is received.

The blocks of the flow diagram of FIG. 6 or 7 or steps and aspects of the operation of the embodiments herein and discussed herein need not be performed in any given or specified order. It is contemplated that additional blocks, steps, or functions may be added, some blocks, steps or functions may not be performed, blocks, steps, or functions may occur contemporaneously, and blocks, steps or functions from one flow diagram may be performed within another flow diagram. For example, the gaze detection function system in FIG. 6 of embodiments herein may contemporaneously monitor for actions detected from a user as well as changes in eye position or loss of eye position in subsequent images captured the camera system in various embodiments.

Devices, modules, resources, or programs that are in communication with one another need not be in continuous communication with each other, unless expressly specified otherwise. In addition, devices, modules, resources, or programs that are in communication with one another may communicate directly or indirectly through one or more intermediaries.

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

The subject matter described herein is to be considered illustrative, and not restrictive, and the appended claims are intended to cover any and all such modifications, enhancements, and other embodiments that fall within the scope of the present invention. Thus, to the maximum extent allowed by law, the scope of the present invention is to be determined by the broadest permissible interpretation of the following claims and their equivalents and shall not be restricted or limited by the foregoing detailed description.

What is claimed is:

1. An information handling system executing code instructions of a gaze detection function system comprising:
a processor executing code instructions of a software application presenting a graphical user interface (GUI) to a user on a display device;
a camera for capturing an image of a user including an image of the user's eyes;
the gaze detection function system detecting a location of a user's gaze relative to a display device location on the display device based on tracking gaze from the image of the user's eyes;

the gaze detection function system determining that the location of the user's gaze on the display screen has been identified and generating a gaze detection feedback signal;

a wireless radio system establishing a wireless link with a wireless headset device and sending the gaze detection feedback signal to the wireless headset device to initiate a first feedback that is selected from an audio feedback or haptic feedback at the wireless headset device to confirm that the display device location on the display device has been identified from the detection of the user's gaze;

the gaze detection function system determining that an action by the user in later images of the user indicate selection of a localized portion at the display device location of a graphical user interface (GUI) presented to the user and generating an action detection feedback signal; and a wireless radio system establishing a wireless link with a wireless headset device and sending the action detection feedback signal to the wireless headset device to initiate a second feedback different from the first feedback that is selected from the audio feedback or the haptic feedback at the wireless headset device to confirm the detection of the action by the user.

2. The information handling system of claim 1, wherein the image of the user's eyes includes an image of the user's pupils for gaze detection.

3. The information handling system of claim 1, wherein the image of the user's eyes includes a Purkinje image of the user's pupils for gaze detection.

4. The information handling system of claim 1 further comprising:

the camera capturing the later images of the user including the user's eyes;

the gaze detection function system detecting the action by the user in the later images of the user to indicate the selection of the localized portion at the display device location of the GUI presented to the user; and the wireless radio system sending the action detection feedback signal to the wireless headset device to initiate both audio feedback and haptic feedback at the wireless headset device to confirm the detection of the action by the user.

5. The information handling system of claim 4, wherein the action includes a blink or a series of blinks by the user detected in the captured later images by the gaze detection function system.

6. The information handling system of claim 1 further comprising:

the camera capturing later images of the user including the user's eyes;

the gaze detection function system detecting a change in the position of the user's eyes and gaze in the later images; and the gaze detection function system re-detecting the user's gaze and a second gaze detection location at a second display device location on the display device and generating the gaze detection feedback signal.

7. The information handling system of claim 6 further comprising:

the wireless radio system sending the gaze detection feedback signal to the wireless headset device to initiate first feedback selected from the audio feedback or the haptic feedback at the wireless headset device to confirm the detection of the second display device location on the display device identified from the detection of the user's gaze.

8. A wireless headset device executing code instructions of an audio and haptic feedback control system comprising:

a microphone and a speaker;

a haptic feedback actuator in an earcup of the wireless headset device;

a wireless headset device radio establishing a wireless link with a host information handling system receiving a gaze detection feedback signal from the host information handling system to confirm gaze detection; and a microcontroller integrated circuit executing code instructions of the audio and feedback control system to determine a first type of haptic feedback from the received gaze detection feedback signal and to drive the haptic actuator to provide the first type of haptic feedback to confirm a gaze detection function from the host information handling system.

9. The wireless headset device of claim 8 further comprising:

the audio and feedback control system to determine a second type of audio feedback from a second received gaze detection feedback signal relating to a gaze detection action detected at the host information handling system and to drive the speaker to provide the second type of audio feedback to confirm a gaze detection action to the user from the host information handling system.

10. The headset device of claim 8, wherein the wireless link is a Bluetooth® Low Energy (BLE) wireless link.

11. The headset device of claim 8, wherein the haptic actuator is a piezo haptic device located in plural earcups of the wireless headset device.

12. The headset device of claim 8, wherein the headset device is a pair of earbuds with the haptic actuator located in at least one earbud.

13. The headset device of claim 8 further comprising:

the audio and feedback control system to determine the first type of haptic feedback from the received gaze detection feedback signal and to mix an audio feedback signal into an audio data stream playing at the speaker to provide a second type of audio feedback in addition to the first type of haptic feedback to confirm the gaze detection function from the host information handling system.

14. The headset device of claim 9 further comprising:

the audio and feedback control system to determine the second type of audio feedback from the second gaze detection feedback signal relating to a gaze detection action detected at the host information handling system and to drive the haptic actuator to provide a third type of haptic feedback to confirm a second gaze detection function relating to a gaze detection action detected at the host information handling system in addition to the second type of audio feedback.

15. An information handling system executing code instructions of a gaze detection function system comprising:

a processor executing code instructions of a software application presenting a graphical user interface (GUI) and a cursor to a user on a display device;

a camera for capturing an image of a user including an image of the user's eyes;

the gaze detection function system detecting a location of a user's gaze relative to a display device location on the display device based on tracking gaze from the image of the user's eyes;

the gaze detection function system displaying cursor at the display device location detected on the display device;

the gaze detection function system determining that the location of the user's gaze on the display screen has been identified with the display device location and generating a first gaze detection feedback signal; and a wireless radio system establishing a wireless link with the headset device and sending the first gaze detection feedback signal to the headset to initiate a first audio feedback at a speaker and a haptic feedback at a haptic actuator located in an earcup of the headset device to confirm that the display device location has been identified from the detection of the location of the user's gaze.

16. The information handling system of claim 15 further comprising:

the camera capturing later images of the user including the user's eyes;

the gaze detection function system detecting an action by the user in the later images of the user to indicate that the cursor is not in a correct display device location; and the gaze detection function system re-detecting a second gaze detection location at a second display device location and moving the cursor to the second display device location on the display device.

17. The information handling system of claim 16 further comprising:

the wireless radio system sending a second gaze detection feedback signal to the wireless headset device to initiate a second audio or haptic feedback at the wireless headset device to confirm the detection of the action by the user.

18. The information handling system of claim 17, wherein the action by the user is a blink or series of blinks detected in the later images of the user by the gaze detection function system.

19. The information handling system of claim 15 further comprising:

the camera capturing later images of the user including the user's eyes;

the gaze detection function system detecting an action by the user in the later images of the user to indicate selection of a GUI element at the cursor in the display device location on the display device; and the wireless radio system sending a second gaze detection feedback signal to the wireless headset device to initiate a second audio or haptic feedback at the wireless headset device to confirm the detection of the action by the user.

20. The information handling system of claim 15, wherein the gaze detection function system operates a cursor control system to detect plural actions by the user via gaze detection in images of the user captured by the camera and the gaze detection function system sends plural gaze detection feedback signals to the wireless headset device to provide audio or haptic feedback to the user during use of gaze for cursor control functions.

* * * * *